(12) United States Patent
Grüneberg et al.

(10) Patent No.: US 11,792,450 B2
(45) Date of Patent: Oct. 17, 2023

(54) BROADCAST STREAMING OF PANORAMIC VIDEO FOR INTERACTIVE CLIENTS

(71) Applicant: Fraunhofer-Gesellschaft zur Förderung der angewandten Forschung e.V., Munich (DE)

(72) Inventors: Karsten Grüneberg, Berlin (DE); Serhan Gül, Berlin (DE); Cornelius Hellge, Berlin (DE); Yago Sánchez, Berlin (DE); Thomas Schierl, Berlin (DE); Robert Skupin, Berlin (DE)

(73) Assignee: FRAUNHOFER-GESELLSCHAFT ZUR FÖRDERUNG, Der Angewandten Forschung E.V. München (DE)

( * ) Notice: Subject to any disclaimer, the term of this patent is extended or adjusted under 35 U.S.C. 154(b) by 597 days.

(21) Appl. No.: 16/198,957

(22) Filed: Nov. 23, 2018

(65) Prior Publication Data

US 2019/0098348 A1    Mar. 28, 2019

Related U.S. Application Data

(63) Continuation of application No. PCT/EP2017/057334, filed on Mar. 28, 2017.

(30) Foreign Application Priority Data

May 26, 2016    (EP) .................... 16171579

(51) Int. Cl.
*H04N 21/234*    (2011.01)
*H04N 21/236*    (2011.01)
(Continued)

(52) U.S. Cl.
CPC .  *H04N 21/234345* (2013.01); *H04N 21/2362* (2013.01); *H04N 21/2365* (2013.01);
(Continued)

(58) Field of Classification Search
CPC ....... H04N 21/234345; H04N 21/2362; H04N 21/2365; H04N 21/4345; H04N 21/4347; H04N 21/4402; H04N 21/8451
(Continued)

(56) References Cited

U.S. PATENT DOCUMENTS

| | | | | |
|---|---|---|---|---|
| 8,325,821 B1 * | 12/2012 | Kizhepat | ........ | H04N 21/234345 |
| | | | | 375/240.26 |
| 9,894,422 B2 | 2/2018 | Hwang et al. | | |

(Continued)

FOREIGN PATENT DOCUMENTS

| | | |
|---|---|---|
| CN | 103718562 A | 4/2014 |
| GB | 2509953 A | 7/2014 |

(Continued)

OTHER PUBLICATIONS

International Search Report dated Jul. 17, 2017, issued in application No. PCT/EP2017/057334.

(Continued)

*Primary Examiner* — Dominic D Saltarelli
(74) *Attorney, Agent, or Firm* — McClure, Qualey & Rodack, LLP

(57) ABSTRACT

For transmitting a panorama video having a resolution higher than a decoder can decode, at a transmitter side, encoded data coding different (groups of) spatial segments of a video picture of a video stream are packetized into separate substreams, to obtain a group of separate substreams. At a receiver side, from the group of separate substreams a proper subset of the separate substreams is extracted and combined to a data stream containing encoded data coding respectively a proper subset of the spatial segments or groups of subsequent spatial segments of the video picture of the video stream. Thus, a decoder may decode only a subregion of the video picture of the video (Continued)

stream, the subregion being defined by the spatial segments or groups of spatial segments coded in the encoded data contained in the data stream.

15 Claims, 16 Drawing Sheets

(51) Int. Cl.
| | |
|---|---|
| *H04N 21/845* | (2011.01) |
| *H04N 21/434* | (2011.01) |
| *H04N 21/44* | (2011.01) |
| *H04N 21/2343* | (2011.01) |
| *H04N 21/2362* | (2011.01) |
| *H04N 21/2365* | (2011.01) |
| *H04N 21/4402* | (2011.01) |

(52) U.S. Cl.
CPC ..... *H04N 21/4345* (2013.01); *H04N 21/4347* (2013.01); *H04N 21/4402* (2013.01); *H04N 21/8451* (2013.01)

(58) Field of Classification Search
USPC .......................................... 725/116
See application file for complete search history.

(56) References Cited

U.S. PATENT DOCUMENTS

| | | | |
|---|---|---|---|
| 2012/0189049 | A1 | 7/2012 | Coban et al. |
| 2014/0089990 | A1 | 3/2014 | van Deventer et al. |
| 2014/0140415 | A1 | 5/2014 | Choe et al. |
| 2014/0168512 | A1 | 6/2014 | Suh et al. |
| 2015/0207834 | A1* | 7/2015 | Zhao ................ H04L 69/165 |
| | | | 709/231 |
| 2016/0134895 | A1* | 5/2016 | Suehring .............. H04N 19/33 |
| | | | 375/240.01 |
| 2016/0337706 | A1* | 11/2016 | Hwang ............. H04N 21/4382 |

FOREIGN PATENT DOCUMENTS

| | | |
|---|---|---|
| GB | 2524599 A | 9/2015 |
| WO | 2015126144 A1 | 8/2015 |

OTHER PUBLICATIONS

Korean language office action dated Dec. 12, 2019, issued in application No. KR 10-2018-7037665, and its English language translation.
Chinese Office Action dated Aug. 31, 2020, issued in application No. 201780046872.3.
English Translation of Chinese Office Action dated Aug. 31, 2020, issued in application No. 201780046872.3.

* cited by examiner

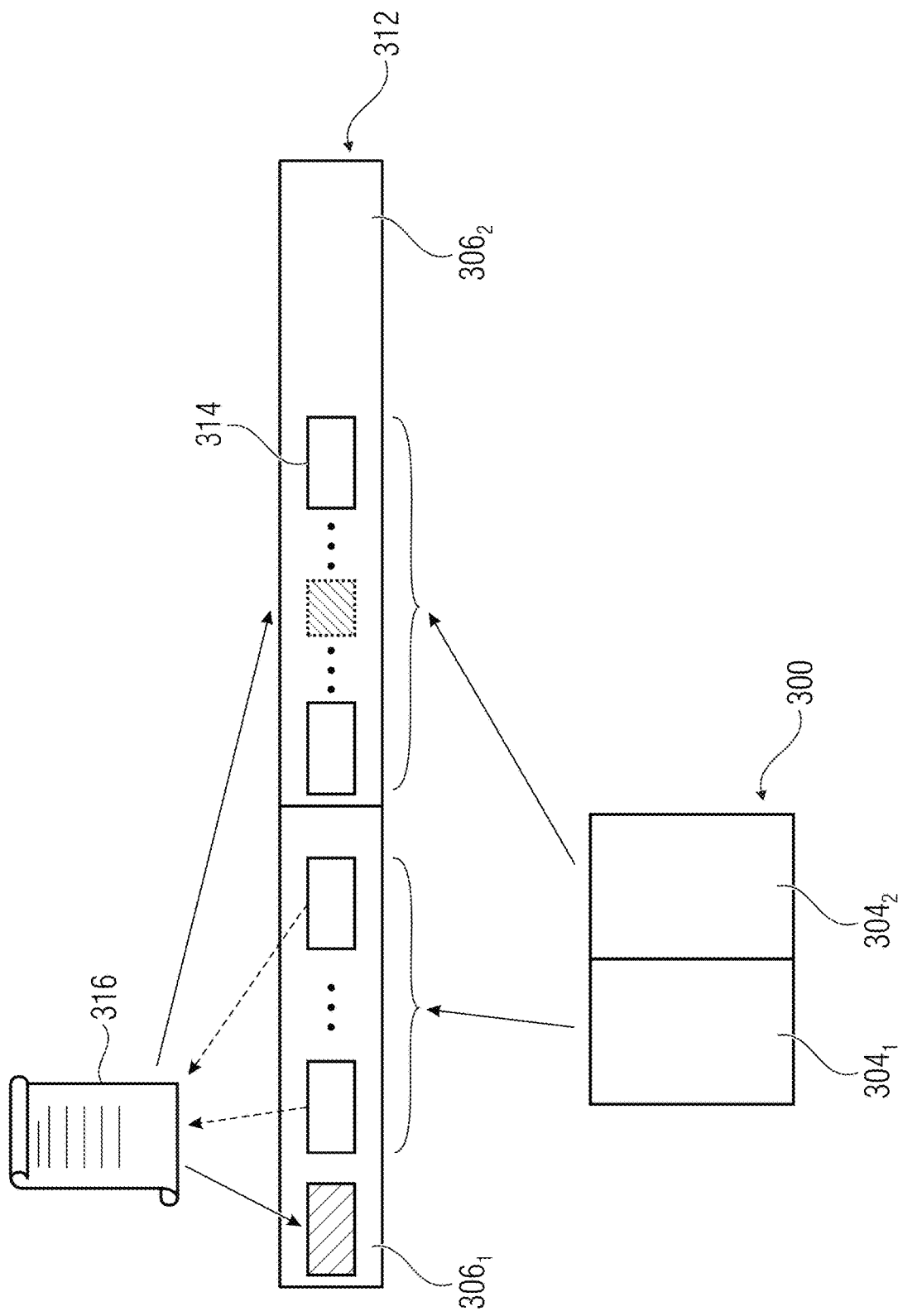

BROADCAST STREAMING OF PANORAMIC VIDEO FOR INTERACTIVE CLIENTS

CROSS-REFERENCE TO RELATED APPLICATIONS

This application is a continuation of copending International Application No. PCT/EP2017/057334, filed Mar. 28, 2017, which is incorporated herein by reference in its entirety, and additionally claims priority from European Application No. 16171579.2, filed May 26, 2016, which is also incorporated herein by reference in its entirety.

BACKGROUND OF THE INVENTION

Embodiments relate to a stream multiplexer. Further embodiments relate to a stream demultiplexer. Further embodiments relate to a video stream. Some embodiments relate to broadcast streaming of panoramic video for interactive clients.

Region of Interest (RoI) streaming, aka interactive panorama streaming, is becoming more and more popular. The idea behind such a streaming service is to navigate within a very wide angle and high resolution video showing at the receiver side only a part of the whole video, i.e. the RoI.

Usually the whole panorama video is encoded at a very high resolution, e.g. 16K, and cannot be sent as is to a receiver, since it cannot be decoded by existing hardware, e.g. 4K.

Therefore, it is, in accordance with a first aspect of the present application, the object of the present invention to provide a concept that allows sending a panorama video to a decoder even though the panorama video comprises a resolution that is higher than the decoder can decode.

SUMMARY

According to an embodiment, a stream multiplexer may have: a reception interface for receiving encoded data for each of at least two different spatial segments or different groups of subsequent spatial segments of a video picture of a video stream encoded thereinto; and a data stream former configured to packetize the encoded data for each of the at least two different spatial segments or different groups of subsequent spatial segments into separate substreams, and to provide the separate substreams at an output.

According to another embodiment, a stream demultiplexer may have: a data stream former configured to selectively extract at least two separate substreams from a group of separate substreams, the at least two separate substreams containing encoded data coding different spatial segments or different groups of subsequent spatial segments of a video picture of a video stream, wherein the data stream former is configured to combine the at least two separate substreams to a data stream containing the encoded data coding the different spatial segments or different groups of subsequent spatial segments of the video picture of the video stream; and an output interface configured to provide the data stream.

Another embodiment may have an encoder configured to encode a video picture of a video stream by encoding at least two different spatial segments or different groups of subsequent spatial segments of the video picture of the video stream such that the encoded data has at least two slices; wherein the encoder is configured to provide a signaling information indicating whether a coding constraint is fulfilled; wherein the coding constraint is fulfilled when removing at least one slice header of the at least two slices while maintaining a slice header of the first slice of the at least two slices with respect to a coding order and concatenating the at least two slices or a proper subset of the at least two slices using the first slice header results in a standard conformant data stream.

According to another embodiment, a method for stream multiplexing may have the steps of: receiving encoded data for each of at least two different spatial segments or different groups of subsequent spatial segments of video pictures of a video stream; and packetizing the encoded data for each of the at least two different spatial segments or different groups of spatial segments into separate substreams.

According to still another embodiment, a method for stream demultiplexing may have the steps of: selectively extracting at least two separate substreams from a group of separate substreams, the at least two separate substreams containing encoded data coding different spatial segments or different groups of subsequent spatial segments of a video picture of the video stream; and combining the at least two separate substreams to a data stream containing the encoded data coding the different spatial segments or different groups of subsequent spatial segments of a video picture of the video stream.

Another embodiment may have a non-transitory digital storage medium having stored thereon a computer program for performing a method for stream multiplexing, the method having the steps of: receiving encoded data for each of at least two different spatial segments or different groups of subsequent spatial segments of video pictures of a video stream; and packetizing the encoded data for each of the at least two different spatial segments or different groups of spatial segments into separate substreams, when said computer program is run by a computer.

Another embodiment may have a non-transitory digital storage medium having stored thereon a computer program for performing a method for stream demultiplexing, the method having the steps of: selectively extracting at least two separate substreams from a group of separate substreams, the at least two separate substreams containing encoded data coding different spatial segments or different groups of subsequent spatial segments of a video picture of the video stream; and combining the at least two separate substreams to a data stream containing the encoded data coding the different spatial segments or different groups of subsequent spatial segments of a video picture of the video stream, when said computer program is run by a computer.

Still another embodiment may have a group of separate substreams, wherein each of the separate substreams contain encoded data coding different spatial segments or different groups of subsequent spatial segments of a video picture of a video stream.

Another embodiment may have an encoded video stream, wherein the encoded video stream has encoded data coding at least two different spatial segments or different groups of subsequent spatial segments of the video picture of the video stream using at least two slices; wherein the encoded video stream has a signaling information indicating whether a coding constraint is fulfilled; wherein the coding constraint is fulfilled when removing at least one slice header of the at least two slices while maintaining a slice header of the first slice of the at least two slices with respect to a coding order and concatenating the at least two slices or a proper subset of the at least two slices using the first slice header results in a standard conformant data stream.

Another embodiment may have a data stream being composed of a sequence of NAL units, the sequence of NAL units having a first set of one or more NAL units which forms a self-contained data stream parameterized so as to encode a first picture, the NAL units of the first set being selected out of a first set of one or more NAL unit types, and a second set of one or more NAL units each of which is of one of a second set of one or more predetermined NAL unit types, disjoint to the first set, and determined to lead to an ignorance of the respective NAL unit by a legacy decoder.

Another embodiment may have an apparatus for generating a first data stream out of a second data stream, the second data stream having encoded thereinto a picture composed of a plurality of spatial segments, wherein the second data stream is composed of a sequence of NAL units, the sequence of NAL units having a first set of one or more NAL units parameterized so as to encode a predetermined spatial segment, the NAL units of the first set being selected out of a first set of one or more NAL unit types, wherein the apparatus is configured to cut-out the first set of one or more NAL units out of the second data stream so as to adopt same into the first data stream; re-parameterize the first set of one or more NAL units so as to encode the predetermined spatial segment as a self-contained picture; insert a second set of one or more NAL units into the first data stream each of which is of one of a second set of one or more predetermined NAL unit types, disjoint to the first set, and determined to lead to an ignorance of the respective NAL unit by a legacy decoder.

Another embodiment may have an apparatus for processing a data stream configured to receive a data stream being composed of a sequence of NAL units, the sequence of NAL units having a first set of one or more NAL units which forms a self-contained data stream parameterized so as to encode a first picture, the NAL units of the first set being selected out of a first set of one or more NAL unit types, and a second set of one or more NAL units each of which is of one of a second set of one or more predetermined NAL unit types, disjoint to the first set, wherein the second set of one or more NAL units is interspersed into the sequence of NAL units, for each NAL unit of the second set, discard an immediately succeeding NAL unit of the first set, or a portion thereof, from the sequence of NAL units along with the respective NAL unit of the second set and/or insert a NAL unit of one of the first NAL unit types, carried in a payload section of the respective NAL unit of the second set, into the sequence of NAL units in replacement of the respective NAL unit of the second set.

According to another embodiment, a method for generating a first data stream out of a second data stream, the second data stream having encoded thereinto a picture composed of a plurality of spatial segments, wherein the second data stream is composed of a sequence of NAL units, the sequence of NAL units having a first set of one or more NAL units parameterized so as to encode a predetermined spatial segment, the NAL units of the first set being selected out of a first set of one or more NAL unit types, may have the following steps: cut-out the first set of one or more NAL units out of the second data stream so as to adapt same in the first data stream; re-parameterize the first set of one or more NAL units so as to encode the predetermined spatial segment as a self-contained picture; insert a second set of one or more NAL units into the first data stream each of which is of one of a second set of one or more predetermined NAL unit types, disjoint to the first set, and determined to lead to an ignorance of the respective NAL unit by a legacy decoder.

According to still another embodiment, a method for processing a data stream may have the following steps: receive a data stream being composed of a sequence of NAL units, the sequence of NAL units having a first set of one or more NAL units which forms a self-contained data stream parameterized so as to encode a first picture, the NAL units of the first set being selected out of a first set of one or more NAL unit types, and a second set of one or more NAL units each of which is of one of a second set of one or more predetermined NAL unit types, disjoint to the first set, wherein the second set of one or more NAL units is interspersed into the sequence of NAL units, for each NAL unit of the second set, discard an immediately succeeding NAL unit of the first set from the sequence of NAL units along with the respective NAL unit of the second set and/or insert a NAL unit of one of the first NAL unit types, carried in a payload section of the respective NAL unit of the second set, into the sequence of NAL units in replacement of the respective NAL unit of the second set.

Another embodiment may have a non-transitory digital storage medium having stored thereon a computer program for performing a method for generating a first data stream out of a second data stream, the second data stream having encoded thereinto a picture composed of a plurality of spatial segments, wherein the second data stream is composed of a sequence of NAL units, the sequence of NAL units having a first set of one or more NAL units parameterized so as to encode a predetermined spatial segment, the NAL units of the first set being selected out of a first set of one or more NAL unit types, wherein the method has cut-out the first set of one or more NAL units out of the second data stream so as to adapt same in the first data stream; re-parameterize the first set of one or more NAL units so as to encode the predetermined spatial segment as a self-contained picture; insert a second set of one or more NAL units into the first data stream each of which is of one of a second set of one or more predetermined NAL unit types, disjoint to the first set, and determined to lead to an ignorance of the respective NAL unit by a legacy decoder, when said computer program is run by a computer.

Another embodiment may have a non-transitory digital storage medium having stored thereon a computer program for performing a method for processing a data stream having receive a data stream being composed of a sequence of NAL units, the sequence of NAL units having a first set of one or more NAL units which forms a self-contained data stream parameterized so as to encode a first picture, the NAL units of the first set being selected out of a first set of one or more NAL unit types, and a second set of one or more NAL units each of which is of one of a second set of one or more predetermined NAL unit types, disjoint to the first set, wherein the second set of one or more NAL units is interspersed into the sequence of NAL units, for each NAL unit of the second set, discard an immediately succeeding NAL unit of the first set from the sequence of NAL units along with the respective NAL unit of the second set and/or insert a NAL unit of one of the first NAL unit types, carried in a payload section of the respective NAL unit of the second set, into the sequence of NAL units in replacement of the respective NAL unit of the second set, when said computer program is run by a computer.

Embodiments of the first aspect provide a stream multiplexer comprising a reception interface and a data stream former. The reception interface is configured to receive encoded data for each of at least two different spatial segments or different groups of subsequent spatial segments of a video picture of a video stream. The data stream former is configured to packetize the encoded data for each of the at least two different spatial segments or different groups of subsequent spatial segments into separate substreams, and to provide the separate substreams at an output.

Embodiments provide a stream demultiplexer comprising a data stream former and an output interface. The data stream former is configured to selectively extract at least two separate substreams from a group of separate substreams, the at least two separate substreams containing encoded data coding different spatial segments or different groups of subsequent spatial segments of a video picture of the video stream, wherein the data stream former is configured to combine the at least two separate substreams to a data stream containing the encoded data coding the different spatial segments or different groups of subsequent spatial segments of the video picture of the video stream.

In embodiments, for sending a panorama video comprising a resolution that is higher than a decoder can decode, at a transmitter side, encoded data coding different spatial segments or different groups of spatial segments of a video picture of a video stream are packetized into separate substreams, to obtain a group of separate substreams. At a receiver side, from the group of separate substreams a proper subset (i.e., only a part) of the separate substreams is extracted and combined to a data stream containing encoded data coding respectively a proper subset (i.e., only a part) of the spatial segments or groups of subsequent spatial segments of the video picture of the video stream. Thus, a decoder decoding the data stream may decode only a subregion of the video picture of the video stream, the subregion being defined by the spatial segments or groups of spatial segments coded in the encoded data contained in the data stream.

Further embodiments provide a method for stream multiplexing, the method comprising:
  receiving encoded data for each of at least two different spatial segments or different groups of subsequent spatial segments of video pictures of a video stream; and
  packetizing the encoded data for each of the at least two different spatial segments into separate substreams.

Further embodiments provide a method for stream demultiplexing, the method comprising:
  selectively extracting at least two separate substreams from a group of separate substreams, the at least two separate substreams containing encoded data coding different spatial segments or different groups of subsequent spatial segments of a video picture of the video stream; and
  combining the at least two separate substreams to a data stream containing the encoded data coding the different spatial segments or different groups of subsequent spatial segments of a video picture of the video stream.

Further embodiments provide an encoder configured to encode a video picture of a video stream by encoding at least two different spatial segments or different groups of subsequent spatial segments of the video picture of the video stream such that the encoded data comprises at least two slices. The encoder can be configured to provide a signaling information indicating whether a coding constraint is fulfilled. The coding constraint is fulfilled when removing at least one slice header of the at least two slices while maintaining a slice header of the first slice of the at least two slices with respect to a coding order and concatenating the at least two slices or a proper subset of the at least two slices using the first slice header results in a standard conformant data stream.

Further embodiments provide a group of separate substreams, wherein each of the separate substreams contain encoded data coding different spatial segments or different groups of subsequent spatial segments of a video picture of a video stream.

Embodiments provide a transmitter for encoding a video stream. The transmitter comprises a coding stage and a stream multiplexer. The coding stage is configured to encode at least two different spatial segments or different groups of subsequent spatial segments of a video picture of the video stream to obtain encoded data for each of the at least two different spatial segments or different groups of subsequent spatial segments. The stream multiplexer comprises a reception interface configured to receive the encoded data for each of the at least two different spatial segments or different groups of subsequent spatial segments of the video picture of the video stream. Further, the stream multiplexer comprises a data stream former configured to packetize the encoded data for each of the at least two different spatial segments into separate substreams, and to provide the separate substreams at an output.

In embodiments, the coding stage of the transmitter can be configured to structure the video pictures of video stream in spatial segments and to separately encode the spatial segments or groups of subsequent (subsequent with respect to coding order) spatial segments to obtain encoded data for each of the spatial segments or groups of subsequent spatial segments. The data stream former of the transmitter can be configured to packetize the encoded data for each of the spatial segments or groups of subsequent spatial segments into separate substreams, and to provide the separate substreams at a transmitter output.

For example, the coding stage of the transmitter can be configured to encode a first spatial segment or a first group of subsequent spatial segments to obtain first encoded data and to encode a second spatial segment or second group of subsequent spatial segments to obtain second encoded data. The data stream former of the transmitter can be configured to packetize the first encoded data in a first substream or first group of substreams and to packetize the second encoded data in a second substream or second group of substreams.

In embodiments, the coding stage of the transmitter can be configured to receive a plurality of video streams, each video stream containing a picture segment of the video picture, i.e. the picture segments contained in the plurality of video streams together form the video picture. Thereby, the coding stage can be configured to structure the video picture of the video streams in spatial segments, such that each spatial segment or group of spatial segments corresponds to one of the video streams.

In embodiments, the separate substreams or group of separate substreams can be transmitted, broadcasted or multicasted.

In embodiments, the coding stage can be configured to separately encode the at least two different spatial segments, such that the encoded data for each of the at least two different spatial segments or different groups of subsequent spatial segments is decodable by itself. For example, the coding stage can be configured such that no information is shared among different spatial segments. In other words, the coding stage can be configured to encode the video stream such that inter-prediction is constrained in such a way that spatial segments of a video picture are not predicted from different spatial segments of previous video pictures.

In embodiments, the coding stage of the transmitter can be configured to encode the at least two different spatial segments or different groups of subsequent spatial segments of the video picture of the video stream such that the encoded data for each of the at least two different spatial segments or different groups of subsequent spatial segments comprises at least one slice, wherein the data stream former of the transmitter can be configured to packetize each slice in one separate substream.

For example, the coding stage of the transmitter can be configured to encode each spatial segment such that the encoded data for each spatial segment comprises one slice, i.e. one slice per spatial segment. Further, the coding stage of the transmitter can be configured to encode each spatial segment such that the encoded data for each spatial segment comprises two or more slices, i.e. two or more slices per spatial segment. Further, the coding stage of the transmitter can be configured to encode each group of subsequent spatial segments such that the encoded data for each group of subsequent spatial segments comprises one slice, i.e. one slice per group of subsequent spatial segments (e.g., two or more spatial segments). Further, the coding stage of the transmitter can be configured to encode each group of subsequent spatial segments such that the encoded data for each group of subsequent spatial segments comprises two or more slices, i.e. two or more slices per group of subsequent spatial segments (e.g., two or more spatial segments), such as one slice per spatial segment, two or more slices per spatial segment, etc.

In embodiments, the data stream former of the transmitter can be configured to packetize each slice in one separate substream without a slice header. For example, the data stream former of the transmitter can be configured to remove the slice headers from the slices before packetizing the slices in separate substreams.

In embodiments, the data stream former can be configured to provide a further separate stream (or more than one, e.g. different picture sizes) comprising a suitable slice header and needed parameter sets. For example, the suitable slice headers may contain a parameter set referencing with a new picture size.

In embodiments, the data stream former of the transmitter can be configured to generate a substream descriptor assigning a unique substream identity to each of the separate substreams.

For example, the data stream former can be configured to provide a group of separate substreams comprising the separate substreams and the substream descriptors, e.g., a program map table comprising the substream descriptors (e.g., in the program map table, a substream descriptor may be assigned to each substream, i.e. one substream descriptor per substream). The substream descriptors can be used to find the separate substreams in the group of separate substreams based on the unique substream identities.

In embodiments, the data stream former of the transmitter can be configured to generate a subregion descriptor signaling patterns of substream identities belonging to a subregion of the video picture of the video stream, or in other words, signaling for each of at least one spatial subdivision of the video pictures of video stream into subregions, one set of substream identities for each subregion.

For example, the data stream former can be configured to provide a group of separate substreams comprising the separate substreams and the subregion descriptor, e.g., a program map table comprising the subregion descriptor. The subregion descriptor describes which substreams contain encoded data coding spatial segments or groups of subsequent spatial segments that together form a valid subregion (e.g., a contiguous subregion) of the video picture of the video stream. The subregion descriptor can be used to identify a proper subset of the substreams which belong to a suitable subregion of the video pictures of the video stream.

In embodiments, the coding stage of the transmitter can be configured to combine the encoded data of the at least two different spatial segments or different groups of subsequent spatial segments to one slice. The data stream former of the transmitter can be configured to split the one slice or a bitstream of the one slice at spatial segment boundaries in slice portions, and to packetize each slice portion in one substream.

In embodiments, the at least two different spatial segments or different groups of subsequent spatial segments can be encoded into the video stream at one slice per video picture. Thereby, the data stream former can be configured to packetize, for each video picture, a portion of the slice having encoded thereinto a respective one of the tiles or groups of tiles into a separate substream without, for at least one of the at least two tiles or groups of tiles, a slice header of the slice.

For example, the at least two different spatial segments or different groups of subsequent spatial segments can be entropy encoded by the coding stage. Thereby, the coding stage may be configured to entropy encode the at least two different spatial segments or different groups of subsequent spatial segments such that each of the at least two different spatial segments or different groups of subsequent spatial segments are decodable by themselves, i.e. such that no coding information is shared between the at least two different spatial segments or different groups of subsequent spatial segments and other at least two different spatial segments or different groups of subsequent spatial segments of a previous video picture of the video stream. In other words, the coding stage can be configured to reinitialize the entropy encoding of the different spatial segments or different groups of spatial segments after the encoding of each of the different spatial segments or different groups of spatial segments.

In embodiments, the transmitter can be configured to signal a stream type.

For example, a first stream type may signal that the aggregation of separate substreams according to the information found in the subregion descriptor results in a standard conformant data stream.

For example, a second stream type may signal that the aggregation of separate substreams according to the information found in the subregion descriptor results in a data stream that needs to be modified or further processed, to obtain a standard conformant version of data stream.

In embodiments, the data stream former of the transmitter can be configured to provide a transport stream comprising the separate substreams. The transport stream can be, for example, an MPEG-2 transport stream.

In embodiments, the substreams can be elementary streams. In accordance with an alterntive embodiment, multiple substreams can be conveyed by one elementsry stream commonly.

In embodiments, the spatial segments of the video picture of the video stream can be tiles. For example, the spatial segments of the video picture of the video stream can be HEVC tiles.

In embodiments, the coding stage of the transmitter can be a standard conformant coding stage. For example, the coding stage of the transmitter can be an HEVC (HEVC=high efficiency video coded) standard conformant coding stage.

In embodiments the stream multiplexer can be configured to signal at least one out of two stream types. A first stream type may signal that a combination of a proper subset of the separate substreams corresponding to one of at least one spatial subdivision of the video picture of the video stream into subregions results in a standard conformant data stream. A second stream type signals that a combination of a proper subset of the separate substreams corresponding to one of at least one spatial subdivision of the video picture of the video stream into subregions results in a data stream that needs further processing (for example, if header information has to be added or modified, or if parameter sets have to be adapted), to obtain a standard conformant version of data stream.

In embodiments, the at least two different spatial segments or different groups of subsequent spatial segments of the video picture of the video stream are encoded such that the encoded data comprises at least two slices. Thereby, the encoded data can comprise a signaling information indicating whether a coding constraint is fulfilled or wherein the data stream former is configured to determine whether the coding constraint is fulfilled. The coding constraint is fulfilled when removing at least one slice header of the at least two slices while maintaining a slice header of the first slice of the at least two slices with respect to a coding order and concatenating the at least two slices or a proper subset of the at least two slices using the first slice header results in a standard conformant data stream. The stream multiplexer can be configured to signal at least one out of the two stream types in dependence on the coding constraint (e.g., to signal the first stream type if the coding constraint is fulfilled and/or to signal the second stream type else). Further, the multiplexer can be configured to signal the second stream type even if the coding constraint is fulfilled, but parameter sets have to be adapted in order to obtain the standard conformant data stream.

Further embodiments provide a receiver. The receiver comprises a stream demultiplexer and a decoding stage. The stream demultiplexer comprises a data stream former and an output interface. The data stream former is configured to selectively extract at least two separate substreams from the group of separate substreams, the at least two separate substreams containing encoded data coding different spatial segments or different groups of subsequent spatial segments of a video picture of the video stream, wherein the data stream former is configured to combine the at least two separate substreams to a data stream containing the encoded data coding the different spatial segments or different groups of subsequent spatial segments of the video picture of the video stream. The output interface is configured to provide the data stream. The decoding stage is configured to decode the encoded data contained in the data stream, to obtain the at least two different spatial segments of the video picture of the video stream.

In embodiments, the decoding stage decoding the data stream may decode only a subregion of the video picture of the video stream, the subregion being defined by the spatial segments or groups of spatial segments coded in the encoded data contained in the data stream.

In embodiments, the receiver can be configured to receive the group of separate substreams, e.g., from the above described transmitter, the group of separate substreams comprising separate substreams. Each of the separate substreams can comprise encoded data coding a spatial segment or a group of subsequent spatial segments of a plurality of spatial segments into which the video pictures of the video stream are structured.

In embodiments, the data stream former of the receiver can be configured to selectively extract a proper subset of separate substreams from the group of separate substreams, the proper subset of the separate substreams containing encoded data coding a proper subset of spatial segments or groups of subsequent spatial segments of a video picture of the video stream. The data stream former of the receiver can be configured to combine the separate substreams extracted from the group of separate substreams to a new data stream containing the encoded data coding the proper subset of spatial segments or different groups of subsequent spatial segments of the video picture of the video stream. The decoding stage of the receiver can be configured to decode the encoded data contained in the data stream, to obtain the proper subset of spatial segments or groups of subsequent spatial segments of the video picture of the video stream.

For example, the data stream former of the receiver can be configured to selectively extract only a part of the plurality of separate substreams contained in the group of separate substreams and to combine the separate substreams extracted from the to a new data stream. Since the separate substreams extracted from the group of separate substreams contain only a part of the spatial segments into which the video pictures of the video stream are structured also the new data stream to which the separate substreams extracted from the group of separate substreams are combined also contains encoded data coding only a part of the spatial segments into which the video pictures of the video stream are structured.

In embodiments, the decoding stage of the receiver can be configured to decode the data stream containing only the encoded data contained in the extracted subset of the plurality of separate substreams, thereby decoding a subregion of the video picture of the video stream, the subregion of the video picture being smaller than the video picture, and the subregion being defined by the spatial segments coded in the encoded data contained in the in the extracted subset of the plurality of separate elementary streams.

In embodiments, the data stream former of the receiver can be configured to extract from the group of separate substreams a subregion descriptor signaling patterns of substream identities belonging to a subregion of the video picture of the video stream, wherein the data stream former can be configured to select the subset of substreams to be extracted from the group of separate substreams using the subregion descriptor.

For example, the data stream former of the receiver can be configured to extract from the group of separate substreams the subregion descriptor, e.g., a program map table comprising the subregion descriptor. The subregion descriptor describes which substreams contain encoded data coding spatial segments or groups of subsequent spatial segments that together form a valid subregion (e.g., a contiguous subregion) of the video picture of the video stream. Based on the subregion descriptor, the data stream former of the receiver can select a proper subset of the substreams for extraction that belong to a suitable subregion of the video picture of the video stream.

In embodiments, the data stream former of the receiver can be configured to extract from the group of separate substreams a substream identifier assigning a unique substream identity to each of the separate substreams, wherein the data stream former can be configured to localize the subset of substreams to be extracted from the group of separate substreams using the substream descriptor.

For example, the data stream former of the receiver can be configured to extract from the group of separate substreams the substream descriptor, e.g., a program map table comprising the substream descriptor. Based on the substream descriptor that assigns a unique substream identity to each of the separate substreams the data stream former of the receiver can identify (e.g., find or localize) the separate substreams in the group of separate substreams. According to an alternative embodiment, a descriptor in an adaptation field is used to identify packets belong to a certain substream.

In some embodiments, the receiver can comprise a data stream processor 127. The data stream processor can be configured to further process the data stream 126 if the data stream 126 provided by the data stream former 121 is not standard conformant, i.e. not decodable by the decoding stage 124, to obtain a processed version 126' (i.e., standard conformant version) of the data stream 126. If a further processing is used, this may be signaled by the transmitter 100 in a stream type.

For example, a first stream type may signal that the aggregation of separate substreams according to the information found in the subregion descriptor results in a standard conformant data stream. Thus, if the first stream type is signaled, no further processing of the data stream 126 is required, i.e. the data stream processor 127 can be bypassed and the decoding stage 124 may directly decode the data stream 126 provided by the data stream former 122. A second stream type may signal that the aggregation of separate substreams according to the information found in the subregion descriptor results in a data stream that needs to be modified or further processed, to obtain a standard conformant version of data stream. Thus, if the first stream type is signaled, a further processing of the data stream 126 is needed, i.e. in this case the data stream processor 127 may further process the data stream 126 to obtain a processed version 126' (i.e., standard conformant version) of the data stream 126.

In embodiments, the stream demultiplexer can be configured to identify a signaled stream type of the group of separate substreams out of at least two stream types. A first stream type may indicate that a combination of a proper subset of the separate substreams corresponding to one of at least one spatial subdivision of the video picture of the video stream into subregions results in a standard conformant data stream. A second stream type indicates that a combination of a proper subset of the separate substreams corresponding to one of at least one spatial subdivision of the video picture of the video stream into subregions results in a data stream that needs a further processing, to obtain a standard conformant version of data stream. The stream demultiplexer can comprise a data stream processor configured to further process the data stream using a processing information contained in at least one substream of the group of separate substreams, to obtain a standard conformant version of the data stream.

In embodiments, the group of separate substreams can be a transport stream. The transport stream can be, for example, an MPEG-2 transport stream.

In embodiments, the substreams can be elementary streams.

In embodiments, the spatial segments of the video picture of the video stream can be tiles. For example, the spatial segments of the video picture of the video stream can be HEVC tiles.

In embodiments, the data stream former of the receiver can be configured to combine the separate substreams extracted from the group of separate substreams to a standard conformant data stream. The data stream can be, for example, a HEVC standard conformant data stream.

In embodiments, the decoding stage of the receiver can be a standard conformant decoding stage. For example, the decoding stage of the receiver can be a HEVC standard conformant decoding stage.

In embodiments, the encoded data provided by the encoding stage of the transmitter forms an encoded video stream.

In embodiments, the encoded video stream comprises encoded data coding at least two different spatial segments or different groups of subsequent spatial segments of the video picture of the video stream using at least two slices. The encoded video stream comprises a signaling information indicating whether a coding constraint is fulfilled, wherein the coding constraint is fulfilled when removing at least one slice header of the at least two slices while maintaining a slice header of the first slice of the at least two slices with respect to a coding order and concatenating the at least two slices or a proper subset of the at least two slices using the first slice header results in a standard conformant data stream.

For example, the signaling information may indicate that values of syntax elements of the slice headers of a first slice and all other slices of a video picture are similar to the extent that removing all but the slice header of the first slice and concatenating the data results in a conformant encoded video stream.

In embodiments, the signaling information is present in the encoded video data stream in the form of a flag in the video usability information or in a supplemental enhancement information.

In embodiments, the encoded video stream (e.g., provided by the coding stage), can comprise more than one slice per video picture (e.g. one slice with respective slice header per spatial segment) and signaling information that indicates that different spatial segments fulfill encoding constraints, such as using same referencing structures or slice types, i.e. syntax elements of the respective slice header are similar (e.g. slice type), in a way that only the first slice header is used and if this single slice header is concatenated with any amount of slice payload data corresponding to more than one spatial segment; the resulting stream is a conformant video stream as long as the proper parameters sets are prepended to the stream (i.e. as long as the parameter sets are for example modified). In other words, if the signaling information is present, it is possible to strip-off all slices headers but the first slice and the concatenation of the first slice and all other slices without their slices headers leads to a conformant encoded video stream. The signaling information of the above constraint can be present in the encoded video stream in the form of a flag in the Video Usability Information (VUI) or in a Supplemental Enhancement Information (SEI) in case of HEVC.

In accordance with a second aspect of the present application, the object of the present invention is to provide a concept that allows sending a substream or a partial data stream pertaining merely a segment of an original picture in a manner allowing easier treatment at reception side.

According to the second aspect, sending a substream or a partial data stream pertaining merely a segment of an original picture in a manner allowing easier treatment at reception side is achieved by adding to a first set of one or more NAL units which forms a self-contained data stream parameterized so as to encode a first picture, the NAL units of the first set being selected out of a first set of one or more NAL unit types, a second set of one or more NAL units each of which is of one of a second set of one or more predetermined NAL unit types, disjoint to the first set, and determined to lead to an ignorance of the respective NAL unit by a legacy decoder. Thereby, it is possible to conserve portions of the original version of the partial data stream which would disturb a legacy decoder in reconstructing the specific segment from the partial data stream by rendering same transparent for legacy decoders, but processing apparatuses interested in these original portions may derive them nevertheless.

BRIEF DESCRIPTION OF THE DRAWINGS

Embodiments of the present invention are described herein making reference to the appended drawings, in which:

FIG. 10 illustrates the NAL-unit structure of the fragments of FIG. 9 in accordance with an embodiment so as to illustrate circumstances which hinder cutting-out one of the fragments as a self-contained segment-specific data stream directly;

DETAILED DESCRIPTION OF THE INVENTION

Figure 1:
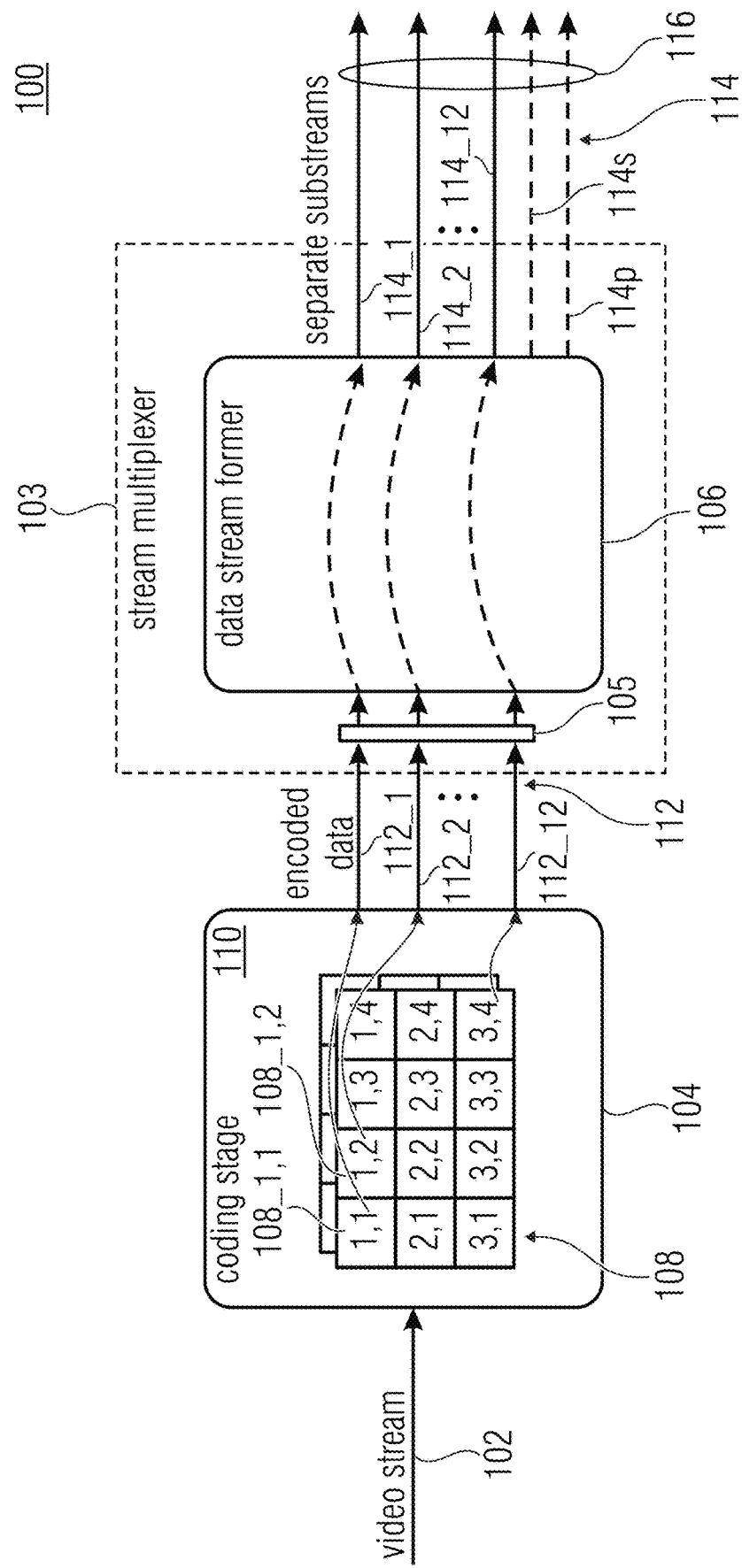
FIG. 1 shows a schematic block diagram of a transmitter, according to an embodiment.

Equal or equivalent elements or elements with equal or equivalent functionality are denoted in the following description by equal or equivalent reference numerals.

In the following description, a plurality of details is set forth to provide a more thorough explanation of embodiments of the present invention. However, it will be apparent to one skilled in the art that embodiments of the present invention may be practiced without these specific details. In other instances, well-known structures and devices are shown in block diagram form rather than in detail in order to avoid obscuring embodiments of the present invention. In addition, features of the different embodiments described hereinafter may be combined with each other, unless specifically noted otherwise.

Although in the following description and in the corresponding figures a transmitter and a receiver, the transmitter comprising a coding stage and a stream multiplexer, and the receiver comprising a stream demultiplexer and a decoding stage, are discussed and shown by way of example and merely for illustration purposes, it is pointed out that embodiments of the present invention relate to the stream multiplexer and the stream demultiplexer, respectively. That is, the coding stage and the decoding stage can be omitted when practicing embodiments of the present invention.

FIG. 1 shows a schematic block diagram of a transmitter 100 according to an embodiment of the present invention. The transmitter 100 comprises a stream multiplexer 103 and a coding stage 104. The coding stage 104 is configured to encode at least two different spatial segments 108 or different groups of subsequent spatial segments 108 of a video picture 110 of the video stream 102 to obtain encoded data 112 for each of the at least two different spatial segments 108 or different groups of subsequent spatial segments 108. The stream multiplexer 103 comprises a reception interface 105 and a data stream former 106. The reception interface 105 is configured to receive the encoded data for each of the at least two different spatial segments or different groups of subsequent spatial segments of the video picture of the video stream encoded in the encoded data. The data stream former 106 is configured to packetize the encoded data 112 for each of the at least two different spatial segments 108 or different groups of subsequent spatial segments into separate substreams 114, and to provide the separate substreams at a transmitter output.

The coding stage 104 of the transmitter 100 can be configured to structure the video pictures 110 of video stream in spatial segments 108. For example, the coding stage 104 can be configured to structure the video pictures 110 of the video stream in NxM spatial segments 108. N can be a natural number that describes a number of columns into which the video pictures 110 of the video stream 102 are structured. M can be a natural number that describes a number of lines into which the video pictures 110 of the video stream 102 are structured. Thereby, one out of N and M can be greater than or equal to two, wherein the other one out of N and M can be greater than or equal to one.

As shown by way of example in FIG. 1, the coding stage 104 can be configured to structure the video pictures 110 of the video stream 102 in four columns (N=4) and three lines (M=3), i.e. in twelve spatial segments 108.

The coding stage 104 of the transmitter 100 can be configured to encode a first spatial segment (e.g., the spatial segment 108_1,1) or a first group of contiguous spatial segments (e.g., the spatial segments 108_1,1 and 108_1,2) to obtain first encoded data (e.g., the encoded data 112_1) and to encode a second spatial segment (e.g., the spatial segment 108_1,2) or second group of contiguous spatial segments (e.g., the spatial segments 108_1,3 and 108_1,4) to obtain second encoded data (e.g., the encoded data 112_2). The data stream former of the transmitter can be configured to packetize the first encoded data in a first substream (e.g., the substream 114_1) or first group of substreams (e.g., the substreams 114_1 and 114_2) and to packetize the second encoded data (e.g., the encoded data 112_2) in a second substream (e.g., the second substream 114_2) or second group of substreams.

As shown by way of example in FIG. 1, the encoding stage 104 of the transmitter 100 can be configured to separately encode each spatial segment 108, to obtain encoded data for each of the spatial segments 108, wherein the data stream former 106 of the transmitter 100 can be configured to packetize each encoded data 112 in one separate substreams 114, i.e., one encoded data per spatial segment and one substream per encoded data. However, it is also possible that the encoding stage 104 of the transmitter 100 is configured to separately encode groups of subsequent spatial segments, to obtain encoded data for each of the groups of subsequent spatial segments, i.e. one encoded data per group of subsequent spatial segments (i.e., two or more subsequent spatial segments). Further, it is also possible that the data stream former 106 of the transmitter 100 is configured to packetize each encoded data 112 in more than one separate substreams, i.e. one set of separate substreams (i.e., two or more separate substreams) per encoded data.

The data stream former 106 of the transmitter 100 can be configured to provide (at its output) a group of separate substreams 116 comprising the separate substreams 114.

The separate substreams or group of separate substreams can be transmitted, broadcasted or multicasted.

Figure 2:
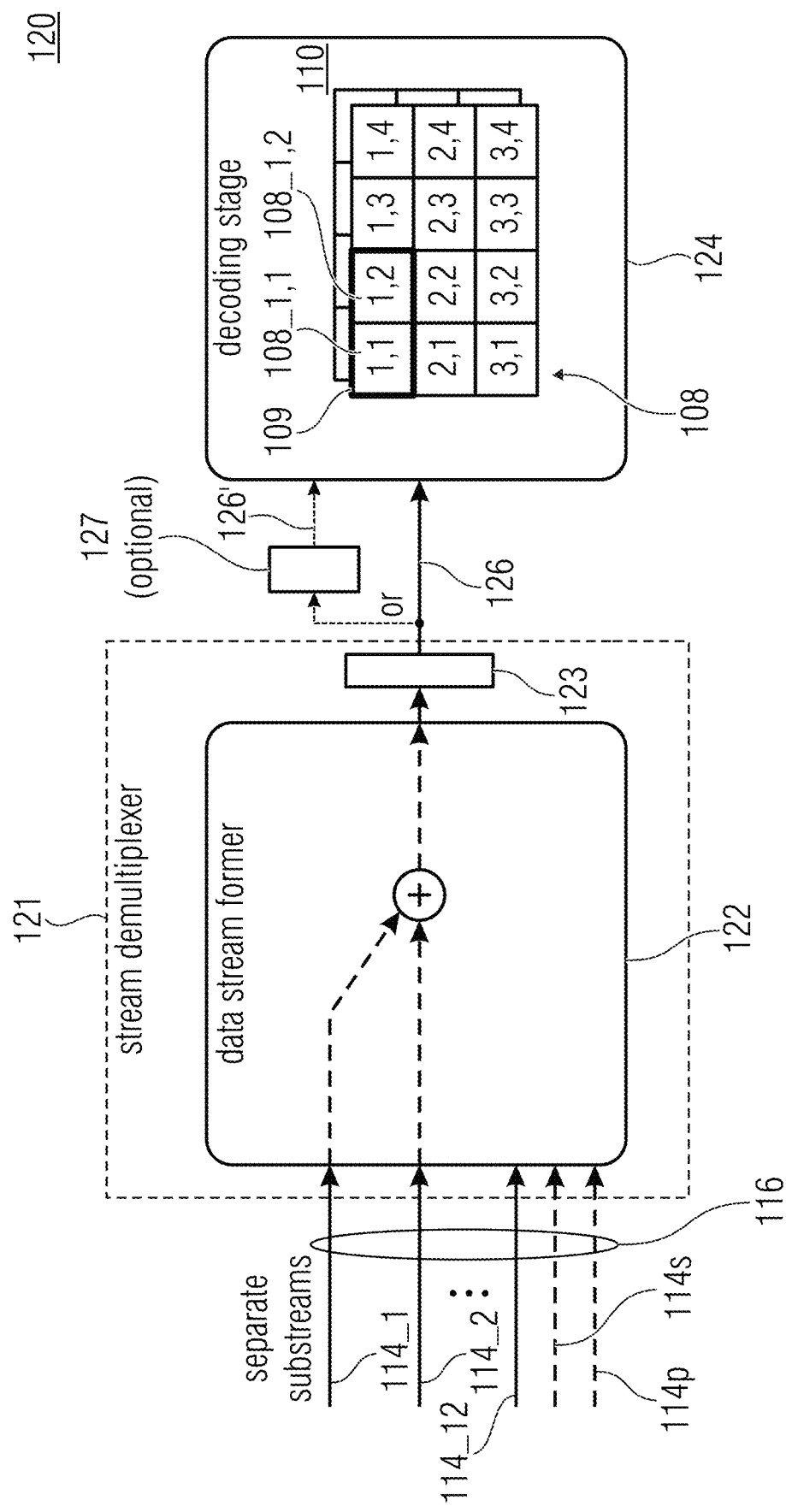
FIG. 2 shows a schematic block diagram of a receiver, according to an embodiment.

FIG. 2 shows a schematic block diagram of a receiver 120, according to an embodiment. The receiver 120 comprises a stream demultiplexer 121 and a decoding stage. The stream demultiplexer comprises a data stream former 122 and an output interface 123. The data stream former 122 is configured to selectively extract at least two separate substreams 114 from the group of separate substreams 116, the at least two separate substreams 114 containing encoded data of different spatial segments 108 or different groups of subsequent spatial segments 108 of a video picture 110 of the video stream 102, wherein the data stream former 122 is configured to combine the at least two separate substreams 114 to a data stream 126 containing the encoded data coding the different spatial segments 108 or different groups of subsequent spatial segments 108 of the video picture 110 of the video stream 102. The output interface 123 is configured to provide the data stream 126. The decoding stage 124 is configured to decode the encoded data contained in the data stream 126, to obtain the at least two different spatial segments 108 or different groups of subsequent spatial segments 108 of the video picture 110 of the video stream 102.

By decoding the data stream 126, the decoding stage 124 may decode only a subregion 109 of the video picture of the video stream, the subregion 109 being defined by the spatial segments or groups of spatial segments coded in the encoded data contained in the data stream, e.g. 108_1,1 and 108_1,2.

The group of separate substreams 116 may comprise a plurality of separate substreams 114, each of the separate substreams coding a different spatial segment or a different group of subsequent spatial segments of a plurality of spatial segments into which the video pictures of the video stream are structured. For example, the video pictures 110 of the video stream can be structured in NxM spatial segments 108. N can be a natural number that describes a number of columns into which the video pictures 110 of the video stream 102 are structured. M can be a natural number that describes a number of lines into which the video pictures 110 of the video stream 102 are structured. Thereby, one out of N and M can be greater than or equal to two, wherein the other one out of N and M can be greater than or equal to one.

The data stream former 122 of the receiver 120 can be configured to selectively extract a proper subset of separate substreams (e.g., the substreams 114_1 and 114_2) from the group of separate substreams 116, the proper subset of the separate substreams containing encoded data coding a proper subset of spatial segments (e.g., the spatial segments 108_1,1 and 108_1,2) or groups of subsequent spatial segments (e.g., a first group of subsequent spatial segments 108_1,1 and 108_1,2 and a second group of subsequent spatial segments 108_1,3 and 108_1,4) of a video picture 110 of the video stream 102. The data stream former 122 of the receiver 120 can be configured to combine the separate substreams (e.g., the substreams 114_1 and 114_2) extracted from the group of separate substreams 116 to a new data stream 126 containing the encoded data coding the proper subset of spatial segments (e.g., the spatial segments 108_1,1 and 108_1,2) or groups of subsequent spatial segments (e.g., a first group of subsequent spatial segments 108_1,1 and 108_1,2 and a second group of subsequent spatial segments 108_1,3 and 108_1,4) of the video picture 110 of the video stream 102.

The decoding stage 124 of the receiver 120 can be configured to decode the encoded data contained in the data stream 126, to obtain the proper subset of spatial segments (e.g., the spatial segments 108_1,1 and 108_1,2) or groups of subsequent spatial segments (e.g., a first group of subsequent spatial segments 108_1,1 and 108_1,2 and a second group of subsequent spatial segments 108_1,3 and 108_1,4) of the video picture 110 of the video stream 102, i.e. the subregion 109 of the video picture 110 of the video stream defined by the spatial segments or groups of spatial segments coded in the encoded data contained in the data stream 126.

As shown by way of example in FIG. 2, the group of separate substreams 116 provided by the transmitter 100 shown in FIG. 1 comprises twelve separate substreams 114_1 to 114_12. Each of the separate substreams 114_1 to 114_12 contains encoded data coding one of twelve spatial segments 108 into which the video pictures 110 of the video stream 102 are structured, i.e. one spatial segment per encoded data and one encoded data per substream. The data stream former 122 may be configured to extract only the first separate substream 114_1 and the second separate substream 114_2 of the twelve separate substreams 114_1 to 114_12. The first separate substream 114_1 comprises encoded data coding a first spatial segment 108_1,1 of the video picture 110 of the video stream, wherein the second separate substream 114_2 comprises encoded data coding a second spatial segment 108_1,2 of the video picture 110 of the video stream. Further, the data stream former 122 can be configured to combine the first separate substream 114_1 and the second separate substream 114_2, to obtain a new data stream 126, the new data stream containing encoded data coding the first spatial segment 108_1,1 and the second spatial segment 108_1,2 of the video pictures of the video stream. Thus, by decoding the new data stream 126, the decoding stage obtains the first spatial segment 108_1,1 and the second spatial segment 108_1,2 of the video picture of the video stream, i.e. only a subregion 109 of the video picture 110 of the video stream defined by the first spatial segment 108_1,1 and the second spatial segment 108_1,2 encoded in the encoded data contained in the data stream 126.

In some embodiments, the receiver 120 can comprise a data stream processor 127. The data stream processor can be configured to further process the data stream 126 if the data stream 126 provided by the data stream former 121 is not standard conformant, i.e. not decodable by the decoding stage 124, to obtain a processed version 126' (i.e., a standard conformant version) of the data stream 126. If a further processing is needed may be signaled by the transmitter 100 in a stream type. A first stream type may signal or indicate that the aggregation of separate substreams according to the information found in the subregion descriptor results in a standard conformant data stream. Thus, if the first stream type is signaled, no further processing of the data stream 126 is required, i.e. the data stream processor 127 can be bypassed and the decoding stage 124 may directly decode the data stream 126 provided by the data stream former 122. A second stream type may signal or indicate that the aggregation of separate substreams according to the information found in the subregion descriptor results in a data stream that needs to be modified or further processed, to obtain a standard conformant version of data stream. Thus, if the second stream type is signaled, a further processing of the data stream 126 is needed, i.e. in this case the data stream processor 127 may further process the data stream 126 to obtain a processed version 126' (i.e., standard conformant version) of the data stream 126. The data stream processor 127 may use an additional information contained in the data stream 126, e.g., contained in one of the substreams 114s and 114p of the group of substreams, to perform the additional processing. The substream 114s may contain a slice header or slice headers, wherein the substream 114p may contain a parameter set or parameters sets. If the group of substreams contains the substreams 114s and 114p, than the data stream former 122 may also extract these substreams.

In other words, the data stream 126 may use an additional processing, in order to be formed into a standard conformant data stream that can be correctly decoded by decoding stage 124 as indicated through the stream type, i.e. if the further processing is needed is indicated in the stream type (e.g., first new stream type and second new stream type as described below). This processing comprises use of an additional information, either put into the encoded data 112 by the coding stage 104 or by data stream former 106 into one of the substreams 114, and which is subsequently contained in data stream 126. By use of the additional information the data stream processor 127 specifically adjusts the coding parameters (e.g. parameter sets) and slice headers in data stream 126 to reflect the actual subset of 116 to be output by 123, i.e. a data stream that differs from 112, e.g. in picture size.

In the following description it is exemplarily assumed that the coding stage a HEVC coding stage and the decoding stage is a HEVC decoding stage. However, the following description is also applicable to other coding and decoding stages, respectively.

Further, in the following description it is exemplarily assumed that group of separate substreams is a transport stream (e.g., a MPEG-2 transport stream), wherein the separate substreams of the group of separate substreams are elementary streams.

HEVC bitstreams can be generated using the "tile" concept, which break in-picture prediction dependencies (including entropy decoding dependencies). The data generated by an encoder for each such tile can be handled separately, e.g. can be processed by one processor/core. If tiles are used, the whole video is structured in a rectangular pattern of N×M tiles. Optionally, each tile can be included into a different slice or many tiles can be included in the same slice. The encoder can be configured in a way that no information is shared among different tiles. For certain use cases, like the presentation of a smaller window (aka region of interest (RoI)) taken from a large panorama, only a subset of the tiles needs to be decoded. In particular, the HEVC bitstream can be encoded in such a way that inter-prediction is constrained in such a way that tiles of a picture are not predicted from different tiles of previous pictures.

Herein, a part of the bitstream that allows decoding a tile or a subset of tiles is called substream. The substream may include slice headers indicating the original position of the tile within the full panorama. In order to use existing hardware decoders, such substream can be converted into a bitstream that conforms with the HEVC standard by adjusting the data indicating the tile position prior to decoding. In addition, when converting the substreams into the new bitstream 126 or 126' also references to picture parameter sets (pps_id) in the slice header may be adjusted. Thereby, through indirect reference to a sequence parameter set parameters such as the picture size may be adjusted and lead to a bitstream that conforms with the HEVC standard.

If the whole bitstream including encoded data for all tiles is sent to a receiver via a broadcast channel, a receiver that is capable to decode a smaller RoI may not be able to handle the large amount of data corresponding to the full panorama. There are different transport protocols for broadcasting, of which the MPEG-2 Transport Stream (TS) is widely used. In the MPEG-2 systems standard, the TS is specified as a sequence of packets with fixed length carrying a PID (packet identifier) for the identification of different ES in a multiplexed stream. PID 0 is used to carry a PAT (program association table), which points to one or more PMT (program map tables) by indicating the PID of each PMT. Within the PMT, a Program Map Section is used to signal the properties of the ESs that belong to a program. However, these sections are limited to 1021 bytes for the description of all ES, which typically include video and probably multiple audio streams or subtitling information, thus substream and subregion information are very compact. MPEG-2 TS currently provides signaling for an HEVC encoded video bitstream sent in an Elementary Stream (ES) that contains a complete panorama. However, the signaling included in the TS indicates the Profile/Tier/Level needed to decode the whole bitstream and if the capabilities of the decoder would not be sufficient to decode a bitstream with such a high Level, which is very probable if the targeted display resolution is much smaller than the whole panorama, the receiver would not start decoding.

In embodiments, the bitstream can be split into separate ESs of which the client can select a subset needed to decode the RoI. An alternative option using a descriptor in an adaptation field, where one ES conveys more than one substream, is described later on. In any case, such subset of substreams is called a subregion. In such case, the current MPEG-2 TS standard provides no signaling to tell the decoder to which level the subregion conforms. Neither can the receiver find out which sets of ESs need to be combined in order to decode a specific subregion. Different subregion sizes can be used, i.e., a set of subregions can consist of a certain number of rows and columns, while another set of subregions can consist of a different number of rows and columns. The following text refers to them as different subregion layouts.

Figure 3:
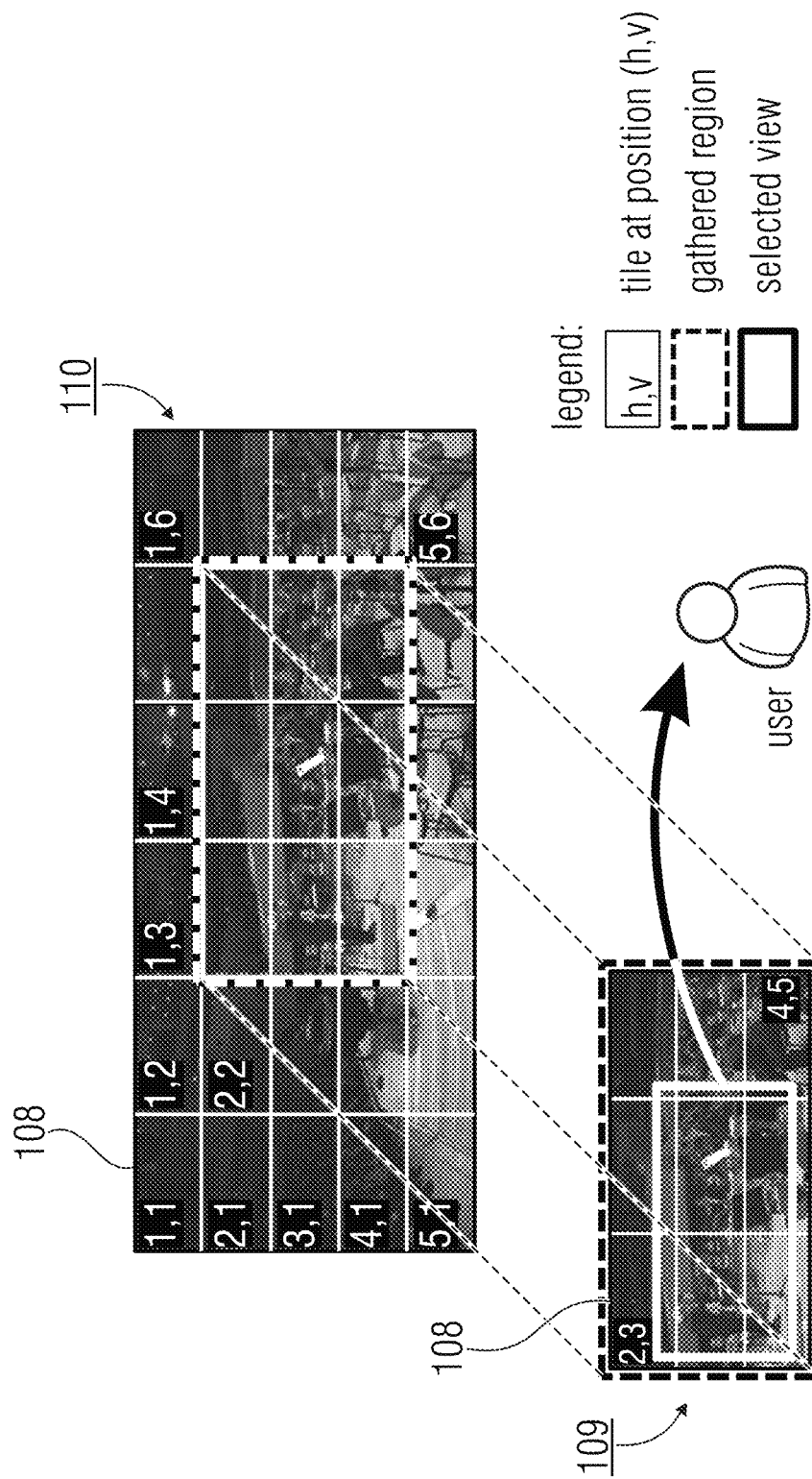
FIG. 3 shows an illustrative view of a video picture of the video stream structured in a plurality of tiles and an illustrative view of a subregion of the video picture defined by a proper subset of the plurality of tiles.

FIG. 3 shows an illustrative view of a video picture 110 of the video stream structured in a plurality of tiles 108 and an illustrative view of a subregion 109 of the video picture 110 defined by a proper subset of the plurality of tiles 108. From the plurality of tiles 108 a proper subset may be gathered to obtain a subregion 109 of the video picture. By way of example, the video picture 110 shown in FIG. 3 is structured in N=6 columns and M=5 lines (or rows), i.e. in NxM=30 tiles. A position of each of the tiles 108 can be described by the indices h and v, wherein h describes the line and v the column. From the 30 tiles 9 tiles may be gathered and form a subregion 109 of the video picture.

In embodiments, the streaming sender can generate substreams 114 that are included in the TS 116 as separate ESs. Inside the ES, each coded picture can be encapsulated in a PES (packetized elementary stream) packet. There are several options to generate the substreams.

For example, according to a first option, the transmitter 100 may generate one slice per substream (i.e. one tile 108 or a fixed set of subsequent tiles 108) and packetize the slice data of each slice into a PES packet, building a separate ES per substream.

According to a second option, the transmitter 100 may generate one slice per substream and the stream multiplexer 103 may strip off all slice headers before packetizing the slice data of each slice into a PES packet, building a separate ES per substream 114. In addition, the transmitter 100 may generate a further separate substream 114s, e.g. a separate ES, that provides suitable slice headers that, when combined with the slice data, result in a conformant HEVC bitstream.

According to a third option, the transmitter 100 may generate only one slice that contains all tiles and splits the bitstream at tile boundaries. The data portion that constitutes a substream can be packetized into a PES packet, building a separate ES per substream. In addition, the transmitter 100 may generate a further separate substream 114s, e.g., a separate ES, that provides suitable slice headers that, when combined with the slice data, result in a conformant HEVC bitstream.

According to a fourth option, the transmitter 100 may generate one slice per substream and introduce signaling information (e.g. in the form of a flag in the VUI (video usability information) or in an SEI (supplemental enhancement information) that indicates a constraint that allows for removing slices headers of all but the first slice and the stream multiplexer 103 based on parsing this signaling information strips off all slice headers before packetizing the slice data of each slice into a PES packet, building a separate ES per substream 114. In addition, the transmitter 100 may generate a further separate substream 114s, e.g. a separate ES, that provides suitable slice headers that, when combined with the slice data, result in a conformant HEVC bitstream.

In the second and fourth option, the stream multiplexer (103) may add a single slice header per video picture (per DTS (Decoding Time Stamp)) to the further stream 114s, i.e. there can be a constraint that a PES packet in the further stream contains a single slice header, so that the demultiplexer can easily re-arrange the PES packets without having to detect video picture boundaries.

In the first option, the transmitter 100 may also generate a separate substream 114s, e.g., a separate ES, that provides additional data consisting of one or more parameter sets or appropriate information, such as a syntax construct containing parameter sets and supplemental information and information on their association with subregions, to derive the parameter sets that, when combined with the slice data, allows to execute the extraction process performed by the data stream processor 127 which then results in a conformant bitstream.

In the second, third and fourth option, the transmitter 100 may also include one or more additional parameter sets in the same separate substream 114s, e.g. separate ES, or generate an additional separate substream 114p, e.g. a separate ES, that includes (only) these parameter sets.

In the first case, the substream 114 consisting of the backward compatible (top left) tile 108_1,1 and optionally subsequent tiles that together form a rectangular region can use the HEVC stream type and legacy descriptors for HEVC specified in the HEVC standard.

A first new stream type may signal that an ES contains a substream. This first new stream type signals that the aggregation of ESs according to the information found in the subregion descriptor as described below results in a conformant bitstream.

Additionally, a second new stream type may signal that the ES contains a substream. This second new stream type signals that the aggregation of ESs according to the information found in the subregion descriptor as described below results in a bitstream that needs to be modified by a process as specified below before it is decoded.

The information can be sufficient to allow the aggregation of a subregion from a suitable set of substreams in the TS demultiplexer (TS Demux), as will become clear from the discussion of FIG. 4 below.

Figure 4:
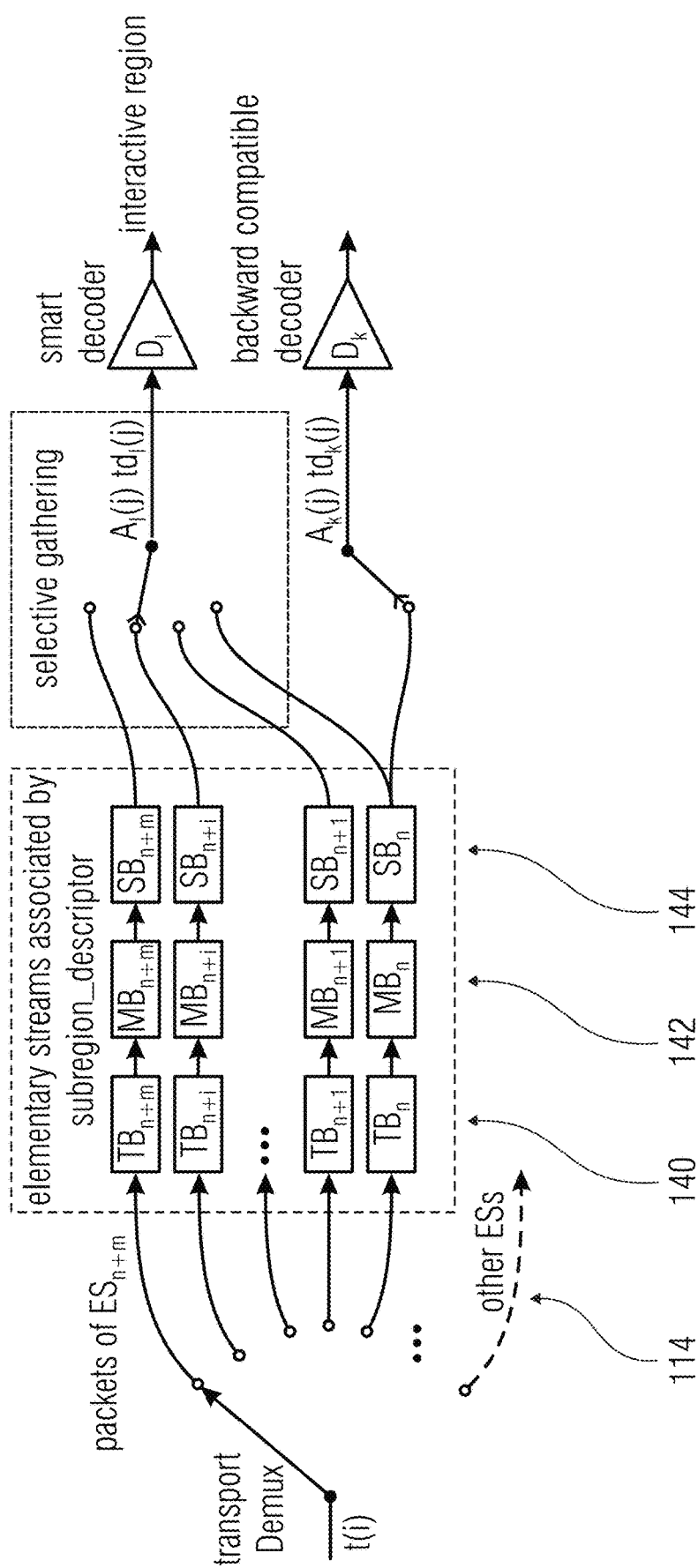
FIG. 4 shows a schematic block diagram of a transport stream demultiplexer.

FIG. 4 shows a schematic block diagram of a transport stream demultiplexer 121 according to an embodiment. The transport stream demultiplexer 121 can be configured to reconstruct each elementary stream 114 using a chain of three buffers 140, 142 and 144. In each chain, the first buffer 140 "TB" (aka Transport Buffer) can be configured to store a transport packet if its PID matches the value that is found in the PMT for a certain ES. The second buffer 142 "MB" (aka Multiplexing Buffer), which exists only for video streams, can be configured to gather the payload of subsequent TS packets by stripping off the TS packet header, thus building the PES packet. The third buffer 144 "SB" (substream buffer) can be configured to gather the ES data. In embodiments, the data in the third buffer 144 may belong to a certain substream 114 and data of multiple substream buffers can be gathered to form the encoded representation of a subregion. Which set of ESs needs to be aggregated in which order is signaled by the information conveyed in descriptors specified below, which are found in the PMT for that program.

In detail, the descriptors specified in the following are extending the set of descriptors specified in the MPEG-2 Systems standard. Type and length of the descriptor are provided in by header bytes, which are not shown in the following syntax tables.

Subsequently the substream signaling is described.

For each ES containing a substream (i.e., a tile or fixed set of subsequent tiles), a newly defined substream descriptor assigns a SubstreamID (substream identity) to that substream. It optionally contains additional SubstreamIDs needed to form a subregion or an index to a pattern that indicates these additional SubstreamIDs by an array of offsets found in the subregion descriptor.

The following syntax (syntax No. 1) may be used for the substream descriptor:

```
Substream_descriptor{
    ReferenceFlag
    SubstreamID
    if ( descriptor_length > 1 ) {
        if ( ReferenceFlag == '1' )
            PatternReference
        else
            for ( i=0; i <SubstreamCountMinus1; i++) {
                AdditionalSubstreamID[i]
            }
    }
}
```

The substream descriptor can be used in three different versions, each signaling the SubstreamID:

According to a first version, if its size is only one byte (preceding header bytes excluded), it signals a value of 0 for the PatternReference (referring to SubstreamOffset[k][0][i] in the subregion descriptor as specified below).

According to a second version, if ReferenceFlag is set to '1', it specifies the index of the pattern to be used to calculate additional SubstreamIDs (other than index 0).

According to a third version, if ReferenceFlag is set to '0', it specifies the additional SubstreamIDs directly.

The value SubstreamCountMinus1 can be found in the subregion descriptor.

Figure 5:
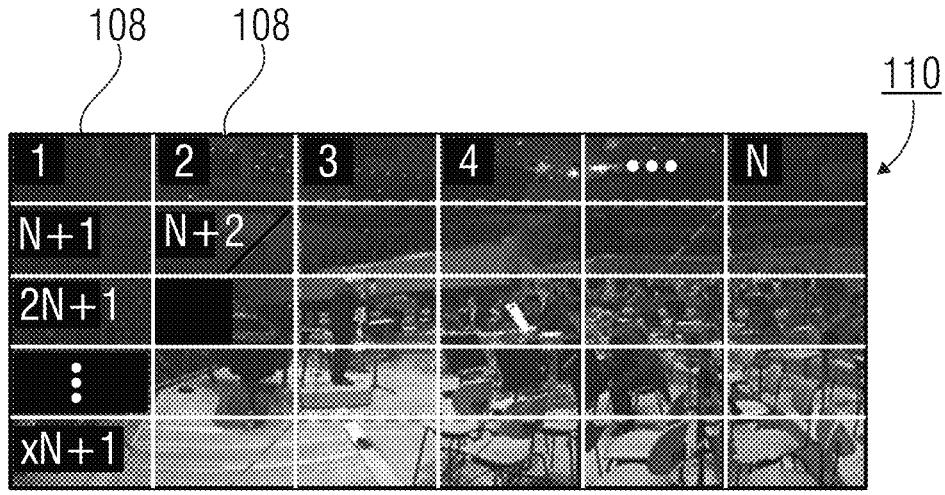
FIG. 5 shows an illustrative view of a video picture of the video stream structured in a plurality of tiles and illustrative views of a single tile and combinations of tiles which form a conformant bitstream when sent as separate elementary streams.

FIG. 5 shows an illustrative view of a video picture 110 of the video stream structured in a plurality of tiles 108 and illustrative views of a single tile and combinations of tiles which form a conformant bitstream when sent as separate elementary streams. As indicated in FIG. 5, a single tile or a fixed set of subsequent (i.e., subsequent with respect to coding order) can be sent as a separate elementary stream, wherein i is the substreamID. Further, as indicated in FIG. 5, when sent as separate elementary streams, the first tile can form a conformant bitstream, the whole panorama can form a conformant bitstream, first and second tiles can form a conformant bitstream, tiles one to N can form a conformant bitstream, tiles one to 2N can form a conformant bitstream, tiles one to Z=N×M can form a conformant bitstream.

Thereby, N can be signaled in the subregion descriptor in the field SubstreamIDsPerLine, wherein Z can be signalled in the subregion descriptor in the field TotalSubstreamIDs.

Subsequently, the subregion signaling is described.

One newly defined subregion descriptor can be associated to the whole program. The subregion descriptor may signal patterns of SubstreamIDs that belong to a subregion 109. It can signal different layouts, which e.g. consist of different numbers of substreams 114, and indicate a level for each pattern. The value of LevelFullPanorama may indicate the level for the whole panorama.

The following syntax may be used for the subregion descriptor:

```
Subregion_descriptor{
    SubstreamIDsPerLine
    TotalSubstreamIDs
    LevelFullPanorama
    for ( l=0; l<N1; l++ ) {
        PreambleCount[l]
        for ( j=0; j<PreambleCount[l]; j++ ) {
            PreambleSubstreamID[j][l]
        }
        SubstreamCountMinus1[l]
        Level[l]
        PictureSizeHor[l]
        PictureSizeVert[l]
        PatternCount[l]
        for ( j=0; j<PatternCount[l]; j++ ) {
            for ( k=0; k<SubstreamCountMinus1[l]; k++ ) {
                SubstreamOffset[k][j][l]
            }
        }
    }
}
```

This syntax could be, in the following manner, extended by a flag SubstreamMarkingFlag which signals one of the two options for substream marking:

a) each substream is associated with an individual Elementary Stream and substreams are identified by the mapping through SubstreamDescriptors in the PMT as it has already been discussed hereinbefore;

b) multiple substreams are transported in a common Elementary Stream and substreams are identified through the af_substream_descriptor found in the adaptation field of a Transport Packet carrying the start of a PES packet which alternative is discussed in more detail below.

The following syntax may then be used for the subregion descriptor:

```
Subregion_descriptor{
    SubstreamMarkingFlag
    SubstreamIDsPerLine
    TotalSubstreamIDs
    LevelFullPanorama
    for ( l=0; l<N1; l++ ) {
        PreambleCount[l]
        for ( j=0; j<PreambleCount[l]; j++ ) {
            PreambleSubstreamID[j][l]
        }
        SubstreamCountMinus1[l]
        Level[l]
        PictureSizeHor[l]
        PictureSizeVert[l]
        PatternCount[l]
        for ( j=0; j<PatternCount[l]; j++ ) {
            for ( k=0; k<SubstreamCountMinus1[l]; k++ ) {
                SubstreamOffset[j][k][l]
            }
```

```
          }
       }
    }
```

Thereby, N1 can be the number of different subregion layouts, indexed by I, that can be selected from the whole panorama. Its value can be implicitly given by the descriptor size. PictureSizeHor[I] and PictureSizeVert[I] may indicate the horizontal and vertical subregion dimension, measured in pixels.

Figure 6:
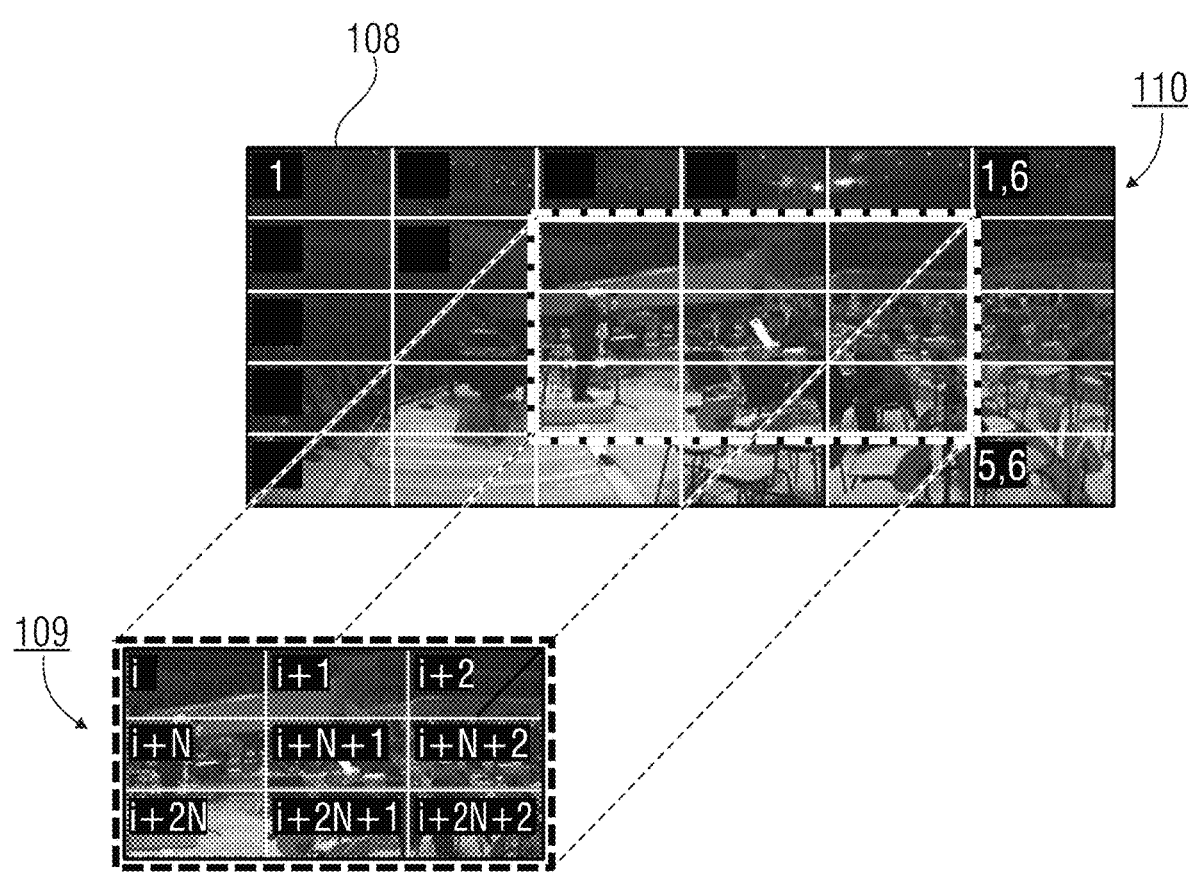
FIG. 6 shows an illustrative view of a video picture of the video stream structured in a plurality of tiles and an illustrative view of a subregion of the video picture defined by a proper subset of the plurality of tiles as well as an offset pattern for the tiles of the subregion.

FIG. 6 shows an illustrative view of a video picture 110 of the video stream structured in a plurality of tiles 108 and an illustrative view of a subregion 109 of the video picture 110 defined by a proper subset of the plurality of tiles 108 as well as an offset pattern for the tiles of the subregion. The video picture 110 shown in FIG. 6 is structured in N=6 columns and M=5 lines (or rows), i.e. in N×M=30 tiles, wherein from the 30 tiles 9 tiles may be gathered and form a subregion 109 of the video picture 110.

For the example shown in FIG. 6, an offset pattern for a subregion of 3×3 substreams can be indicated by the array:
SubstreamOffset[0]: 1
SubstreamOffset[1]: 2
SubstreamOffset[2]: N
SubstreamOffset[3]: N+1
SubstreamOffset[4]: N+2
SubstreamOffset[5]: 2N
SubstreamOffset[6]: 2N+1
SubstreamOffset[7]: 2N+2

Similarly, an offset pattern for a subregion of 2×2 substreams would be indicated by the array:
SubstreamOffset[0]: 1
SubstreamOffset[1]: N
SubstreamOffset[2]: N+1

Subsequently a subregion assembly is described.

A process or method to access a subregion may comprise a first step of choosing, at a receiver side, a suitable subregion size from the subregion descriptor based on the level indication or the subregion dimension. This selection implicitly results in a value I.

Further, the process or method to access a subregion may comprise a step of selecting the ES that contains the upper left substream of the region to be displayed based on the SubstreamID (reading all substream descriptors).

Further, the process or method to access a subregion may comprise a step of checking if the applicable substream descriptor provides a PatternReference. Wth that PatternReference, it selects the applicable SubstreamOffset values:
SubstreamOffset[k][PatternReference][I]
with 0<k<SubstreamCountMinus1[I]

Further, the process or method to access a subregion may comprise a step of defaulting the reference to an index of 0 if there is no PatternReference, which means that the descriptor size is equal to 1.

There may be an ES that is not suitable to form an upper left substream of a subregion, e.g. because this ES is located at the right or bottom edge of a panorama. This can be signaled by a PatternReference value larger than PatternCount[I]−1, which means that no SubstreamOffset value is assigned.

Further, the process or method to access a subregion may comprise a step of executing the following operations for each PES packet of the ESx with a substream descriptor indicating a SubstreamID equal to SubstreamIDx, if the stated condition is met:

if PreambleCount[I]>0: prepend the PES packets with the same DTS of the ESs with a substream descriptor indicating a SubstreamID equal to PreambleSubstreamID[j][I]. The order of the PES packets in the assembled bitstream is given by increasing values of the index j.

if SubstreamCountMinus1[I]>0: append the PES packets with the same DTS of ESs with a substream descriptor indicating a SubstreamID equal to AdditionalSubstreamID[I] given in the substream descriptor of ESx resp. SubstreamIDx+SubstreamOffset[k][j] (the SubstreamOffset array is found in the subregion descriptor, with j given by the value of PatternReference in the substream descriptor of ESx and k ranging from 0 to SubstreamCountMinus1[I]) prior to decoding. The order of the PES packets in the assembled bitstream is given by increasing values of SubstreamID, which also corresponds to increasing values of the index k.

Figure 7:
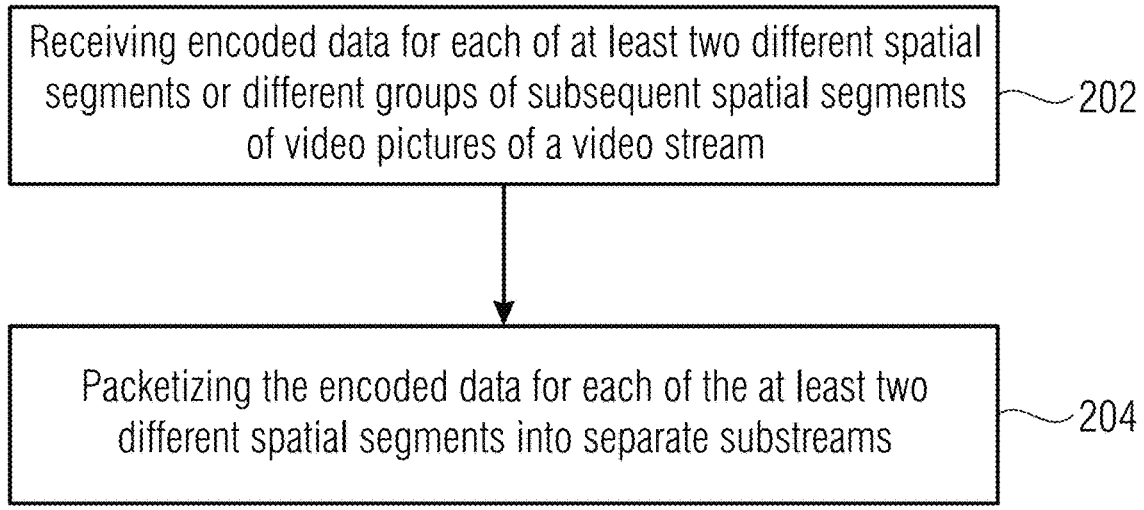
FIG. 7 shows a flowchart of a method for stream multiplexing, according to an embodiment.

FIG. 7 shows a flowchart of a method 200 for stream multiplexing, according to an embodiment. The method 200 comprises a step 202 of receiving encoded data for each of at least two different spatial segments or different groups of subsequent spatial segments of video pictures of a video stream. Further, the method 200 comprises a step 204 of packetizing the encoded data for each of the at least two different spatial segments into separate substreams.

Figure 8:
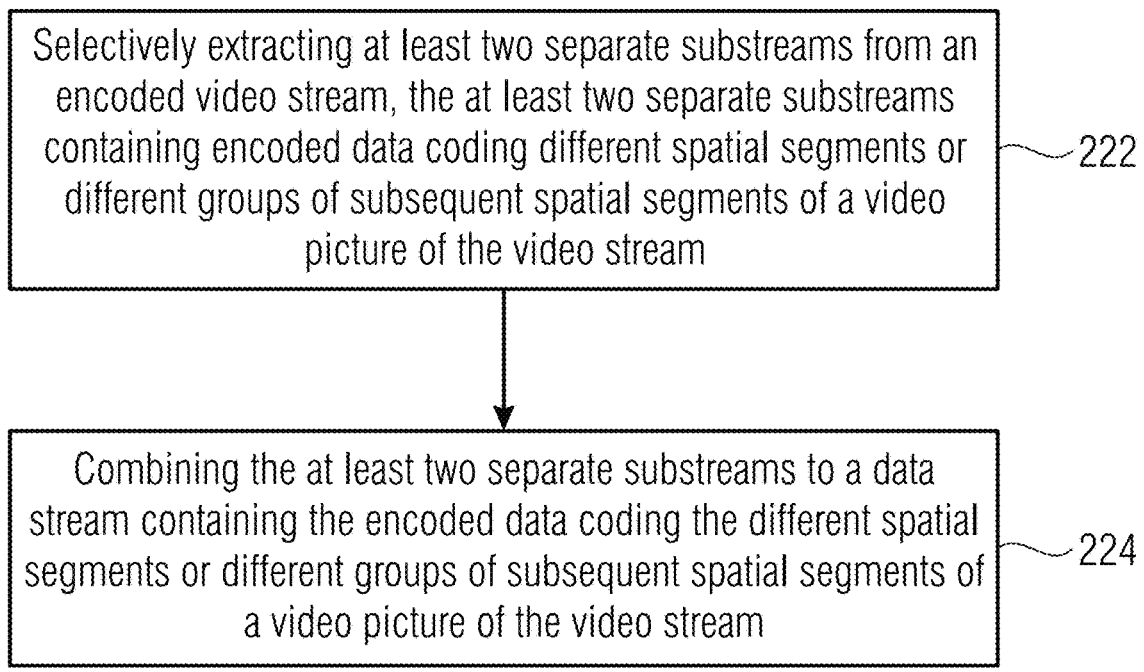
FIG. 8 shows a flowchart of a method for stream demultiplexing, according to an embodiment.

FIG. 8 shows a flowchart of a method 220 for stream demultiplexing. The method 220 comprises a step 222 of selectively extracting at least two separate substreams from an group of separate substreams, the at least two separate substreams containing encoded data coding different spatial segments or different groups of subsequent spatial segments of a video picture of the video stream. Further, the method comprises a step 224 of combining the at least two separate substreams to a data stream containing the encoded data coding the different spatial segments or different groups of subsequent spatial segments of a video picture of the video stream.

Briefly summarizing the above, there has been described a stream demultiplexer 121, comprising a data stream former 122 configured to selectively extract at least two separate substreams from a group of separate substreams 116, the at least two separate substreams 114 containing encoded data coding different spatial segments 108 or different groups of subsequent spatial segments 108 of a picture 110. The encoded data stems from, or is of, a video stream 102. They have been obtained therefrom by stream multiplexing in stream multiplexer 100. The data stream former 122 is configured to combine the at least two separate substreams 114 to a data stream 126 containing the encoded data coding the different spatial segments 108 or different groups of subsequent spatial segments 108 of the video picture 110 of the video stream 102 of the extracted at least two separate substreams 114. The data stream 126 is provided at an output interface 123 of the stream demultiplexer 121.

As described above, the group of separate substreams 116 is comprised by a broadcast transport stream composed of TS packets. The group of separate substreams 116 comprises a plurality of separate substreams 114 which contain encoded data coding different spatial segments 108 or different groups of subsequent spatial segments 108 of the video stream 102. In the above example, each separate substream relates to a picture tile. A program map table is also comprised by the group of separate substreams 116. The stream demultiplexer 121 may be configured to derive, for each of the plurality of separate substreams 114, a stream identifier from the program map table and distinguish each of plurality of separate substreams 114 in the broadcast transport stream using the respective stream identifier called SubstreamID in the above examples. For example, the stream demultiplexer 121 derives a predetermined packet identifier from a program association table conveyed within packets of packet identifier zero in the broadcast transport stream and derives the program map table from packets of the broadcast transport stream having the predetermined packet identifier. That is, the PMT may be conveyed within TS packets the packet ID of which equals the predetermined packet ID indicated in the PAT for the program of interest, i.e. the panorama content. In accordance with the above embodiments, each substream 104 or even each substream 106 was contained in separate elementary streams, i.e. within TS packets of mutual different packet IDs. In this case, the program map table uniquely associates, for instance, each stream identifier with a respective packet identifier and the stream demultiplexer 121 is configured to depacketize each of the plurality of separate substreams 104 from packets of the broadcast transport stream having the packet identifier associated with the stream identifier of the respective separate substream. In this case, substream identifier and packet identifiers of the substreams 104 are quasi synonyms in so far as there is a bijective mapping therebetween in the PMT. In the following, an alternative is described where the substreams 104 are multiplexed into an elementary stream using the concept of tagging NAL units of the substreams 104 via the adaptation field in the packet headers of TS packets of the one elementary stream. In particular, packet headers of TS packets of the one elementary stream into the payload section of which the beginning of any PES packet that contains one or more NAL units of the substreams 104 falls, are provided with an adaptation field which, in turn, is providing with the substream ID of the substream to which the respective one or more NAL units belongs. Later on, it will be shown that this adaptation field also comprises information related to the substream descriptor. The stream demultiplexer 121 is, in accordance with this alternative, configured to depacketize a sequence of NAL units from packets of the broadcast transport stream which have a packet identifier indicated in the program map table, and to associate each NAL unit of this sequence of NAL units with one of the plurality of separate substreams depending on the substream ID indicated in the adaptation field of the packets of the broadcast transport stream that have the packet identifier indicated in the program map table.

Further, as described above, the stream demultiplexer 121 may be configured to read from the program map table information on a spatial subdivision of the video, and video picture 110, respectively, into the segments 108 and to derive the stream identifiers of the plurality of separate substreams 114 inherently from the spatial subdivision by using a mapping from the segments of the spatial subdivision onto the stream identifier. FIG. 5 showed an example, where the stream demultiplexer 121 is configured to read from the program map table information on a spatial subdivision of the video into the segments and to derive the stream identifiers of the plurality of separate substreams 114 so that the stream identifiers of the plurality of separate substreams 114 order the segments within the spatial subdivision along a raster scan. Instead of a raster scan running row-wise as depicted in FIG. 5, any other prideful assignment to the segments may be used such as one running column-wise for the association between segments and stream identifiers and/or packet IDs may be achieved otherwise.

The stream demultiplexer 121 may be configured to read from the program map table or, in accordance with the just-mentioned alternative further described below, the adaptation field of packets carrying the group of separate substreams 116, substream descriptors examples of which were set out above and will be presented below. Each substream descriptor may index one of the plurality of separate substreams 104 by way of the substream ID associated with the one separate substream, and comprise information on which one or more separate substreams 104 of the plurality of separate substreams 104, along with the indexed separate substream, form a coded representation of a subregion 109 extractible as the at least two separate substreams 114 from the group of separate substreams 116, the subregion 109 being composed of the spatial segments 108 or groups of subsequent spatial segments 108 of the one or more separate substreams forming, along with the indexed separate substream, a coded representation 126. The stream demultiplexer 121 may further be configured to read from the program map table information a subregion descriptor indicating one or more spatial subdivisions, indexed using index I in the above examples, of the video into subregions 109. For each such subdivision, each subregion 109 is a set of the spatial segments 108 or groups of subsequent spatial segments 108 of one or more separate substreams 104. Per spatial subdivision of the video into subregions 109, the subregion descriptor may indicate a size of the subregions 109 such as using parameters PictureSizeHor[I] and PictureSizeVert[I]. Additionally, a coding level may be signaled. The at least two separate substreams selectively extracted from the group of separate substreams 116 may, thus, together contain encoded data coding different spatial segments 108 or different groups of subsequent spatial segments 108 which form one of the subregions of one of the one or more spatial subdivisions of the video.

One or more of the substream descriptors (in the above example those for which ReferenceFlag=1) may contain the information on which one or more separate substreams of the plurality of separate substreams are to be extracted, along with the indexed separate substream, as the at least two separate substreams 114 from the group of separate substreams 116 in from of a reference index, such as PatternReference, into a list of sets of stream identifier offsets, such as list SubstreamOffset[ . . . ][j][I] into which PatternReference points by using it as j=PatternReference and with there being one such list per subdivision indexed by I. Each stream identifier offset SubstreamOffset[k][j][I] indicates an offset relative to the stream identifier of the indexed separate substream SubstreamID, i.e. the substream referred to has substream ID equal to SubstreamID of the substream to which the substream descriptor belongs, plus SubstreamOffset[k][j][I].

Alternatively or additionally, one or more of the substream descriptors (in the above example those for which ReferenceFlag=0) may contain the information on which one or more separate substreams of the plurality of separate substreams are to be extracted, along with the indexed separate substream, as the at least two separate substreams 114 from the group of separate substreams 116 in from of a set of stream identifier offsets, e.g. AdditionalSubstreamID [i], each indicating an offset relative to the stream identifier of the indexed separate substream, i.e. by way of offsets explicitly signaled in the substream descriptor.

One or more substreams within group 106 may comprising slice headers and/or parameter sets stripped off from, or dedicated for modifying or replacing slice headers and/or parameter sets of, any of the plurality of separate substreams 114. Irrespective of slice headers and/or parameter sets of the substreams 104 being contained in an extra substream 106 or not, a modification or replacement of slice headers and/or parameter sets to achieve a standard conforming data stream 126' for decoding by a decoder 124 could be performed by a data stream processor 127 of stream demultiplexer 121.

The just mentioned alternative for spending a separate ES for each tile is described now in more detail. The alternative described new may be advantageous in case of relying on existing implementations of demultiplexer structures at receivers which allocate buffers in advance for all ESs that are potentially decoded. Such implementations would thus over-estimate the buffer requirements, jeopardizing some benefits of the solution embodiments presented above. In such cases, it may be beneficial to send multiple tiles within the same ES and assigning a substream identifier to data portions within that ES, so that an advanced demultiplexer 121 can remove unneeded data portions from the ES before it is stored in the Elementary Stream Buffer. In this case, the TS Demux 121 still reconstructs each elementary stream using a chain of three buffers as depicted in FIG. 4. In each chain, the first buffer "TB" (aka Transport Buffer) stores a transport (TS) packet if its PID matches the value that is found in the PMT for a certain ES. In addition to evaluating the PID included in each TS packet header, it also parses the adaptation field, which optionally follows the TS packet header.

Adaptation field syntax from ISO/IEC 13818-1 is presented hereinbelow:

```
adaptation_field( ) {
    adaptation_field_length
    if (adaptation_field_length > 0) {
        discontinuity_indicator
        random_access_indicator
        elementary_stream_priority_indicator
        PCR_flag
        OPCR_flag
        splicing_point_flag
        transport_private_data_flag
        adaptation_field_extension_flag
        if (PCR_flag = = '1') {
            program_clock_reference_base
            reserved
            program_clock_reference_extension
        }
        if (OPCR_flag = = '1') {
            original_program_clock_reference_base
            reserved
            original_program_clock_reference_extension
        }
        if (splicing_point_flag = = '1') {
            splice_countdown
        }
        if (transport_private_data_flag = = '1') {
            transport_private_data_length
            for (i = 0; i < transport_private_data_length; i++) {
                private_data_byte
            }
        }
        if (adaptation_field_extension_flag = = '1') {
            adaptation_field_extension_length
            ltw_flag
            piecewise_rate_flag
            seamless_splice_flag
            af_descriptor_not_present_flag
            reserved
            if (ltw_flag = = '1') {
                ltw_valid_flag
                ltw_offset
            }
            if (piecewise_rate_flag = = '1') {
                reserved
                piecewise_rate
            }
            if (seamless_splice_flag = = '1') {
                splice_type
                DTS_next_AU[32..30]
                marker_bit
                DTS_next_AU[29..15]
                marker_bit
                DTS_next_AU[14..0]
                marker_bit
            }
            if (af_descriptor_not_present_flag = = '0') {
                for (i = 0; i < N; i++) {
                    af_descriptor ( )
                }
            }
            for (i = 0; i < N; i++) {
                reserved
            }
        }
        for (i = 0; i < N; i++) {
            stuffing_byte
        }
    }
}
```

New syntax for carriage of the substream descriptor in the adaptation field could look like:

```
af_substream_descriptor{
    af_descr_tag
    af_descr_length
    Substream_descriptor( )
}
```

A new tag identifies the af_substream_descriptor carrying the substream descriptor. Within the adaptation field, a Substream_descriptor according to syntax No. 1 is sent whenever the TS packet payload contains the start of a PES packet. The Multiplexing Buffer "MB" gathers the payload of subsequent TS packets with the same PID by stripping off the TS packet header and the adaptation field, thus building the PES packet. If the Substream_descriptor indicates a SubstreamID that is not needed for decoding the subregion, the whole PES packet is dropped by the demultiplexer 121, while PES packets with a SubstreamID that match the subregion are stored in the Substream Buffer "SB".

In addition to the substream identification using the Substream_descriptor, a subregion descriptor is transmitted in the PMT associated to the program, as described above. The optional information in the Substream_descriptor is used according to the examples above:

A pattern can be signaled, which indicates a set of offset values that are added to the value of SubstreamID present in the descriptor, resulting in additional SubstreamIDs that complement the desired subregion;

Alternatively, an array of additional SubstreamIDs could be indicated directly or explicitly in the for-loop that extends up to the end of the descriptor, the length of which is indicated by a length value af_descr_length included in the adaptation field before the Substream_descriptor.

The whole extracted bitstream 126 could be forwarded to data stream processor 127 which removes unneeded data and further processes it before forwarding the output bitstream 126' to the decoding stage 124 for storing a standard conformant bitstream for the subregion in the coded picture buffer of the decoder. In this case, some fields of the Subregion_descriptor syntax can be omitted, or the following reduced syntax can be used to indicate the level needed for decoding the subregion together with the resulting horizontal and vertical subregion dimension:

```
Subregion_level_descriptor{
    SubstreamMarkingFlag
    LevelFullPanorama
    for ( I=0; I<N1; I++ ) {
        Level[l]
        PictureSizeHor[l]
        PictureSizeVert[l]
    }
}
```

N1 can be the number of different subregion layouts, indexed by I, that can be selected from the whole panorama. Its value can be implicitly given by the descriptor size. If this descriptor is present in the PMT, the presence of the MCTS extraction information set SEI message in all random access points is mandated. The existence of the Subregion_level_descriptor or the value of the SubstreamMarkingFlag the presence of which in the above syntax example is optional, indicate that the af_substream_descriptor is used to identify the substreams. In this case, the client can adjust the buffer size of the SB to the CPB buffer size indicated by the Level[l].

The following description of the present application concerns embodiments for the task of stream multiplexing, stream de-multiplexing, picture and/or video coding and decoding and the corresponding data streams which tasks not necessarily relate to providing a receiver side with the opportunity to select or vary a subregion within a picture area of a video with respect to which stream extraction is performed from a broadcast transport stream. Nevertheless, the embodiments described below concern an aspect of the present application which is combinable, or may be used in connection with, the above-presented embodiments. Accordingly, at the end of the description of embodiments described subsequently, there follows an outline as to how the embodiments described subsequently may advantageously be used in implementing the embodiments described above.

Figure 9:
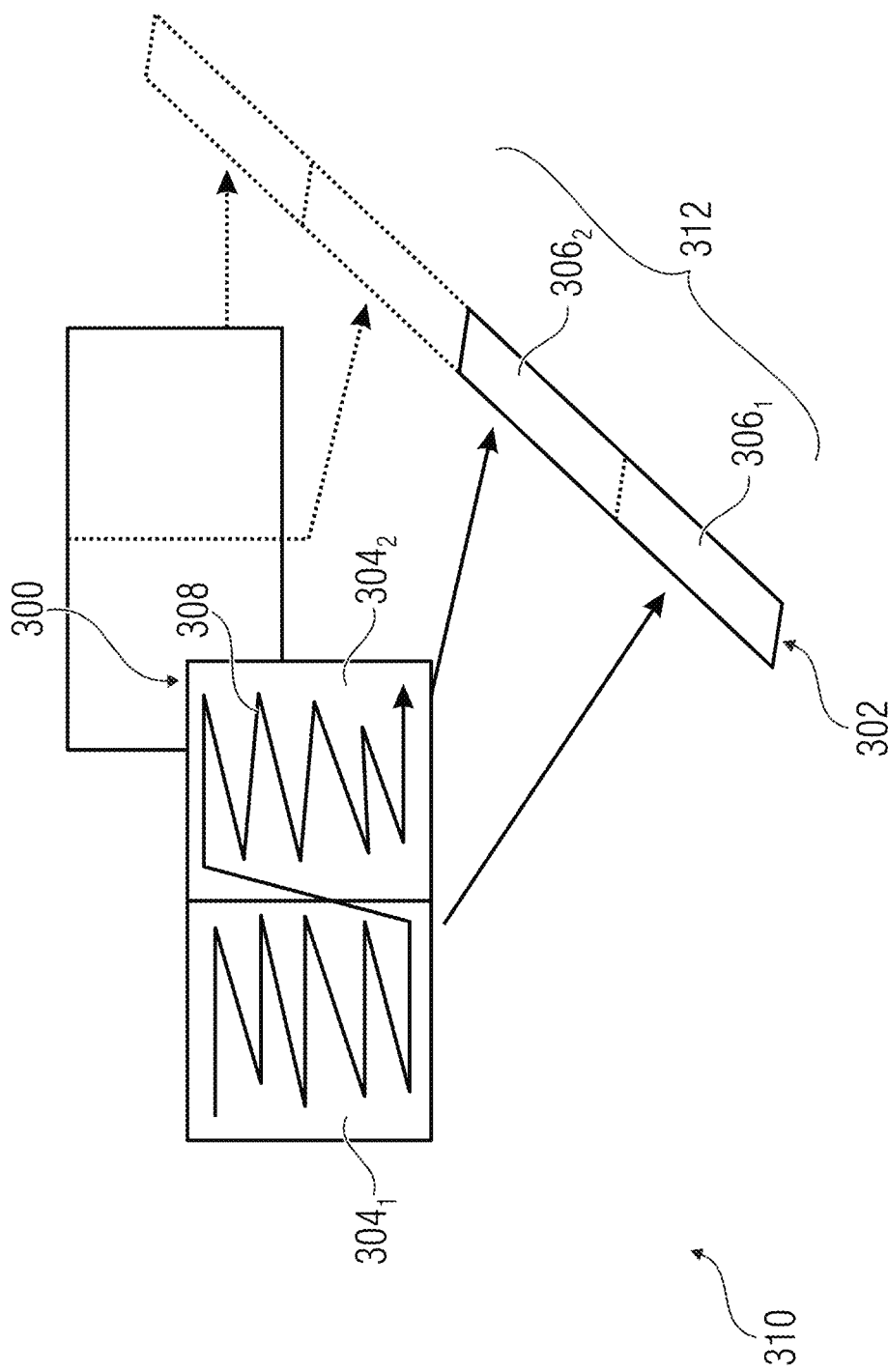
FIG. 9 shows a schematic diagram illustrating a coding of a picture or a video, sub-divided spatially into two segments, into a data stream so that two fragments result, one for each segment, ready to be multiplexed onto segment-specific partial data stream.

In particular, the embodiments described below seek to face the problem outlined in FIG. 9. FIG. 9 shows a picture 300. This picture 300 is coded into a data stream 302. This coding has been, however, done in a manner so that different segments 304 of the picture are coded into the data stream 302 separately or independent from each other, i.e. with suppressing inter-coding dependencies between different segments.

FIG. 9 also illustrates the possibility that the segments 304 of the picture are coded into the data stream 302 sequentially, i.e. so that each segment 304 is coded into a respective continuous fragment 306 of the data stream 302. For example, picture 300 is coded into data stream 302 using a certain coding order 308 which traverses picture 300 in a manner so that the segments 304 are traversed one by one, traversing one segment completely before proceeding with traversing a next segment in coding order 308.

In FIG. 9, merely two segments $304_1$ and $304_2$ and the corresponding two fragments $306_1$ and $306_2$ are shown, but the number of segments could, naturally, be higher than 2.

As described previously, picture 300 could be a picture of a video and in the same manner just described with respect to picture 300, further pictures of video 310 could be coded into data stream 302, where these further pictures sub-divided into segments 304 in the same manner as described with respect to picture 300 and the suppression of inter-segment coding dependencies could also be obeyed with respect to coding dependencies between different pictures so that each segment such as segment $304_2$ of picture 300 could be coded into its corresponding fragment $306_2$ in a manner dependent on the corresponding, i.e. collocated, segment of another picture, but not another segment of another picture. Fragments 306 belonging to one picture would form a continuous portion 312 of data stream 302 that may be called an access unit and they do not interleave with portions of fragments belonging to other pictures of video 310.

FIG. 10 illustrates the coding of picture 300 into a data stream 302 in more detail. In particular, FIG. 10 shows the corresponding portion of data stream 302 into which picture 300 is coded, namely the access unit 312 composed of the concatenation of fragments $306_1$ and $306_2$. FIG. 10 illustrates that the data stream is composed of a sequence of NAL units illustrated in FIG. 10 by rectangles 314. Different types of NAL units may exist. NAL units 314 in FIG. 10, for instance, have encoded into a corresponding slice out of the segment 304 corresponding to the fragment 306 which the respective NAL unit 314 is part of. The number of such slice NAL units per segment 304 may be any number including one or greater than one. The sub-division in two slices follows the afore-mentioned coding order 308. Besides, FIG. 10 illustrates by way of blocks 314 marked with hatching, NAL units which contain in their payload section a parameter set 316 rather than slice data having encoded thereinto a corresponding slice of the corresponding segment 304. Parameter sets such as parameter set 316 are to alleviate, or reduce, the amount of transmission of parameters parameterizing the coding of picture 300 into the data stream. In particular, slice NAL units 314 may refer to, or even point to, such parameter set 316 as illustrated by dashed arrows in FIG. 10, in order to adopt the parameters in such parameter set 316. That is, there may be, for instance, one or more pointers in slice NAL units which point to a parameter set 316 contained in a parameter set NAL unit.

As illustrated in FIG. 10, parameter set NAL unit may be redundantly or repeatedly interspersed between the slice NAL units for the sake, for instance, of increasing the resistivity of the data stream against NAL unit losses or the like, but naturally, the parameter set 316 referred to by slice NAL unit of fragments of $306_1$ and $306_2$ should be comprised by at least one parameter set NAL unit which proceeds the referencing slice NAL units and accordingly, FIG. 10 depicts such parameter set NAL unit at the outermost left-hand side of the sequence of NAL units of access unit 312.

It should be mentioned here that many details described with respect to FIGS. 9 and 10, previously and in the following, are merely presented in order to illustrate problems which might occur when trying to feed a decoder with merely a portion of data stream 302 in order to have that decoder recovering a certain segment of picture 300 or video 310. Although such details are useful in understanding the thoughts underlying the embodiments described herein, it should be clear that these details are merely illustrative in that the embodiments described hereinafter should not be restricted to these details.

In any case, one example of a circumstance which could foil a successful feeding of a decoder with merely one of fragments 306 in order to have that decoder successfully decoding the segment 304 corresponding to this fragment 306, could be a parameter within parameter set 316 relating to a size of picture 300. For instance, such parameter could explicitly indicate the size of picture 300 and as the size of each segment 304 is smaller than the size of picture 300 as a whole, a decoder receiving just a fragment of the plurality of fragment 306 into which a certain picture 300 is coded, without any amendment would be spoilt by such a parameter within parameter set 316. It should be mentioned, that a certain fragment 304, just cut out of the original data stream 302 without any amendment, could even lack any parameter set NAL unit and, thus, lack a component of a valid data stream at all, namely the parameter set. In particular, as a minimum, data stream 302 needs a parameter set NAL unit merely at its beginning of an access unit or, to be more precise, prior to the slice NAL units by which same is referenced. Thus, while the first fragment $306_1$ needs to have a parameter set NAL unit, this is not the case for all following fragments $306_2$ in coding order.

Further examples for circumstances which might hinder a successful cutting-out of a fragment 306 out of data stream 302 with resulting in a successful decoding of the corresponding segment of that fragment, might exist additionally or alternatively. Merely one such further example shall be discussed now. In particular, each slice NAL unit might comprise a slice address which signals its position within the picture area which the data stream the respective slice NAL unit belongs to, is located at. This parameter is addressed also in the following description.

If the above-illustrated circumstances are taken into account, data stream 302 of FIG. 9 may be turned into a data stream relating to one of segments 304 only: 1) cutting-out the fragment 306 corresponding to this segment from data stream 302, 2) modifying the just-mentioned picture-sensitive at least one parameter in the parameter set 316 carried in the parameter set NAL unit, or even inserting such a adapted parameter set NAL unit newly, and 3) if used, modifying the slice address stored in the slice NAL units of the cut-out fragment wherein modification of slice addresses is used whenever the segment 304 of interest is not the first one in the coding order among all segments 304 as, for instance, the slice address is measured along the aforementioned coding order 308 for which, accordingly, the slice addresses relating to the whole picture 300 and the slice address relating to the respective slice's segment only, coincide.

Figure 11A:
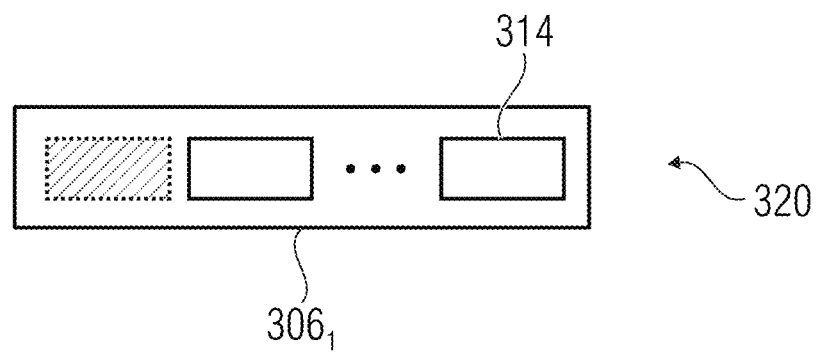
FIGS. 11a & 11b illustrate self-contained segment-specific data streams derived from the corresponding fragment in FIG. 10 by modification of parameter set NAL units and/or slice NAL units.
Figure 11B:
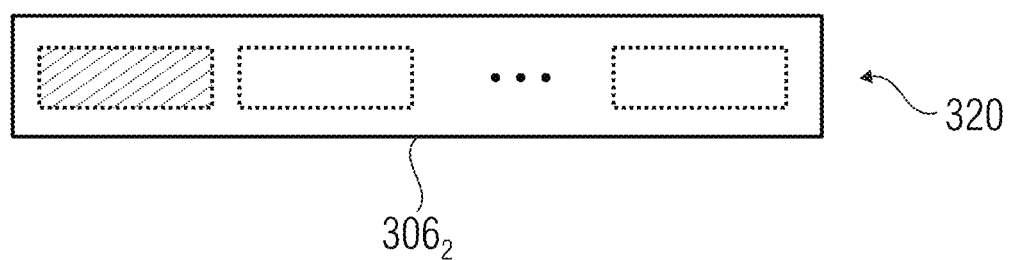

FIG. 11a thus, illustrates the result of extracting and modifying fragment $306_1$ of FIG. 10 so as to result in a self-containment, i.e. a correctly parameterized, sectional data stream, i.e., a data stream merely pertaining and coding the first segment $304_1$. Indicated by the dashed line, it is shown that the modification which led from fragment $306_1$ of the whole data stream 312 to the corresponding portion of data stream 320, namely the access unit pertaining the picture 300 which the segment coded into fragment $306_1$ is located in, merely affected the parameter set NAL unit. FIG. 11b illustrates the result of a corresponding extraction and modification with respect to segment $304_2$. Here, the self-contained sectional data stream 320 comprises fragment $306_2$ of data stream 302 as the access unit pertaining picture 300, but additional modifications have been done. For instance, the parameter set NAL unit within fragment $306_2$ of data stream 302 has been shifted toward the beginning of fragment $306_2$ as far as the self-contained sectional data stream 320 is concerned, in addition to the modification of the at least one parameter of parameter set 316, and the slice NAL units have been modified as far as the slice addresses are concerned. Compared thereto, the slice NAL units were left unchanged in the case of FIG. 11a as the slice addresses coincide as far as the first segment $304_1$ encoding order 308 is concerned.

Modifying fragments 306 of data stream 302 in the manner illustrated with respect to FIGS. 11a and 11b results in information loss. In particular, the parameters and/or slice addresses modified, are no longer visible or known to the receiver of the self-contained data stream 320. It would, thus, be favorable if this information loss could be avoided without disturbing the receiving decoder in successfully decoding the respective self-contained data stream 320.

Figure 12:
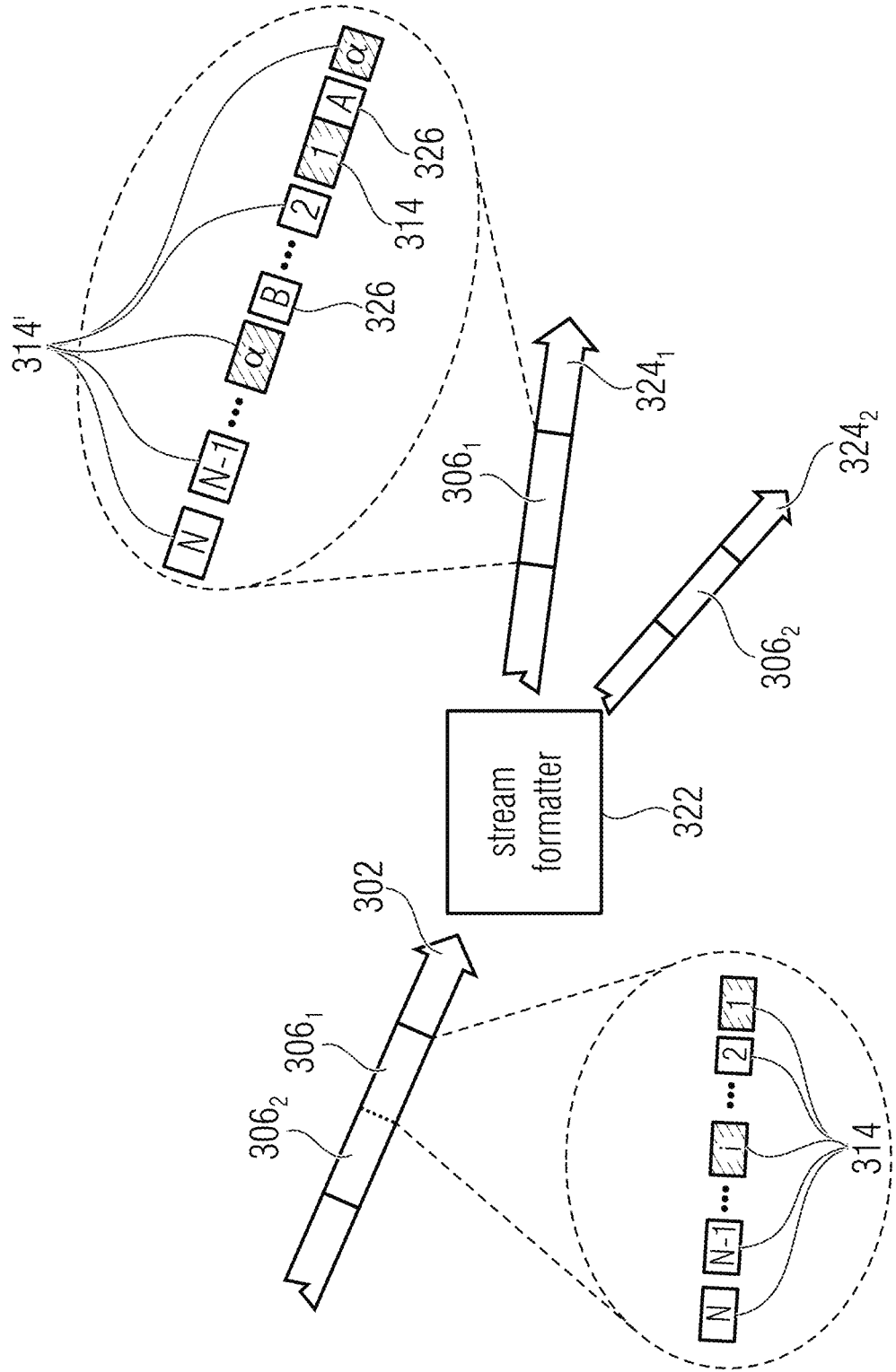
FIG. 12 shows a schematic block diagram of a stream formatter and its mode of operation in distributing the data stream of FIG. 9 onto two partial data streams, one for each segment, with one of the partial data streams being ready to be processed by a legacy decoder for reconstructing the corresponding segment as a self-contained picture, attained by adding/inserting specific NAL units into the modified partial data stream depicted in FIGS. 11a and 11b.

FIG. 12 shows a stream formatter in accordance with an embodiment of the present application which is able to achieve two tasks: firstly, the stream formatter 322 of FIG. 12 is able to demultiplex an in-bound data stream 302 into a plurality of partial data streams 324 each relating to a corresponding segment 304. That is, the number of partial data streams 324 corresponds to the number of segments 304 and corresponding indices are used for these reference numbers as it has also been the case with respect to the fragments 306. The partial data streams 324 could, for instance, broadcasted in accordance with one of the concepts discussed above with respect to FIGS. 1 to 8, namely, for instance, by using one ES for each partial data stream 324.

Stream formatter 322 distributes fragments 306 within data stream 302 onto the corresponding partial data stream 324. Secondly, however, stream formatter 322 turns at least one of the partial data streams 324 into a self-contained data stream correctly parameterized so as to be successfully decodable by a legacy decoder with respect to the segment 304 associated with the respective partial data stream. In FIG. 12, this is illustrated with respect to the first segment, i.e., with respect to the first partial data stream $324_1$. Accordingly, stream formatter 322 has subject the NAL units 314 within fragment $306_1$ to the modification discussed above with respect to FIG. 11a, thereby obtaining NAL unit 314' within data stream $324_1$ out of NAL unit 314 within fragment $306_1$ of data stream 302. Note that not all NAL units might have had to be modified. The same sort of modification could have been done with respect to partial data stream $324_2$ relating to any other segment such as segment $304_2$, but this is not discussed further herein.

As an additional task, however, stream formatter 322 adds NAL units 326 of a specific NAL unit type to the NAL units 314' of partial data stream $324_1$. The latter newly added NAL units 326 are of a NAL unit type selected out of a set of NAL unit types disjoint to the set of NAL unit types which NAL units 314 and 314' are of. In particular, while NAL unit types of NAL units 314 and 314' are of a type understood and processed by legacy decoders, NAL units 326 are of a type supposedly disregarded or dropped by legacy decoders as they are, for instance, of reserved types, reserved for future use. Accordingly, NAL units 326 are disregarded by a legacy decoder. By way of these NAL units 326, however, stream formatter 322 is able to signal to decoders of a second type, i.e., non-legacy decoders, to perform certain modifications on NAL unit 314'. In particular, as discussed further below, one of the NAL units 326, such as the one having the B inscribed in FIG. 12, may indicate that the immediately subsequent NAL unit 314', which is a parameter set NAL unit parameterized for coding segment $304_1$ as a stand-alone picture, is to be dropped or disregarded along with this B NAL unit 326. Additionally or alternatively, one A NAL unit 326 newly added by stream formatter 322 may carry the original parameter set NAL unit relating to picture 300 of data stream 302 in its payload section and may signal to a non-legacy decoder that the NAL unit carried in its payload section is to be inserted in place of, or as a substitute for, itself. Such an A NAL unit 326 may, for instance, follow or succeed the modified parameter set NAL unit 314' at the beginning of fragment $306_1$ within partial data stream $324_1$ so as to "update" the parameter set 316 before the slice NAL units within fragment $306_1$ start, so that a non-legacy decoder merely preliminarily uses NAL unit 314 preceding the A NAL unit 326 for setting the parameters in parameter set 316 with subsequently setting the parameters correctly according to the correct parameter set NAL unit stored in the payload section of A NAL unit 326.

Figure 13:
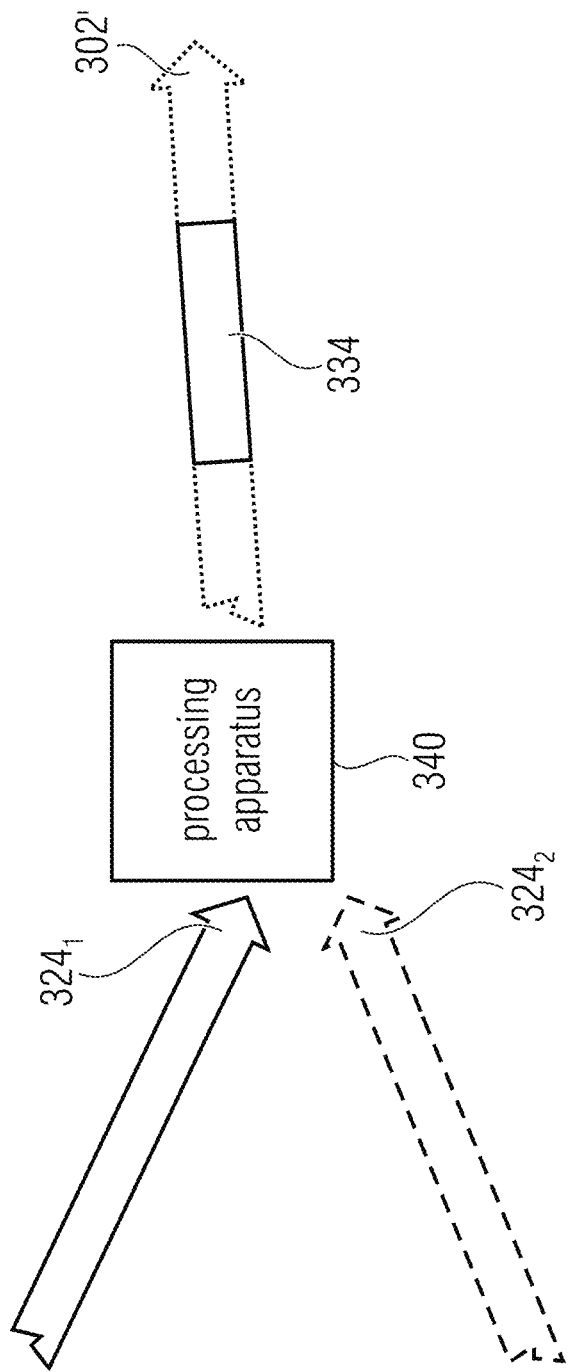
FIG. 13 shows a schematic block diagram of a processing apparatus and its mode of operation in re-building from the partial data streams of FIG. 12 a self-contained data stream 302' again using the inserted special NAL units made transparent to legacy decoders.

Summarizing, a legacy decoder receiving partial data stream $324_1$ receives a self-contained data stream having encoded thereinto segment $304_1$ as a self-contained picture and this legacy decoder is not spoilt by the newly added NAL units 326. A more sophisticated recipient of both partial data streams as depicted in FIG. 13 which shows an apparatus 340 for processing an inbound data stream, is able to reconstruct the whole video or picture, either in one step, or by reconstructing a self-contained overall data stream 302' forming a coding equivalent of data stream 302 again out of the partial data streams 324 and feeding the latter to a legacy decoder capable of dealing with the picture size of picture 300. A minimum task could be to convert the self-contained partial data stream $324_1$ into a reverse parameterized partial data stream 334 by following the instructions indicated by the inserted NAL units 326. Further, merely a subset of the original partial data streams 324 could be output by apparatus 340, this subset pertaining an extraction section out of original picture 300. Apparatus could perform, or not perform, any slice address reverse adaptation of slice addresses of NAL units 314' within partial data stream $324_1$ so as to relate to the whole picture 300 again.

It should be noted that stream formatter's 322 capability of extracting partial data stream $324_1$ out of data stream 302 and rendering it a self-contained data stream decodable by a legacy decoder with nevertheless carrying the original, unmodified parameter data, could be useful without the derivation of the other partial data stream(s) $324_2$. Merely generating partial data stream $324_1$ out of data stream 302 would, thus, be the task of a data stream generator which also forms an embodiment of the present application. Again, all statements are also valid the orher way, namely if generating only partial data stream $324_2$.

In the above-mentioned embodiments, the stream multiplexer 103 could operate the same as stream formatter 322 of FIG. 12 with respect to one or more than one of substreams 114. In FIG. 12, the stream formatter 322 could alternatively or additionally perform the modification plus addition of NAL units 326 with respect to any other partial data stream such as partial data stream $324_2$. Again, the number of partial data streams may be greater than two. At the receiver side, any stream former receiving the thus processed partial data stream $324_1$, such as a non-legacy decoder or a stream de-multiplexer such as stream de-multiplexer 121, could, among other tasks, perform the task of following the instructions defined by the NAL units 326, thereby resulting in a partial data stream which, at least, is correct with respect to the parameter set 316 when concatenated with the other fragments of the original data stream 302. Merely the slice addresses within the slice NAL units might have to be modified if the concatenation of fragments $324_1$ and $324_2$, for instance, would have to be decoded as a whole.

It goes without saying that the partial data streams 324 may be conveyed within separate elementary streams, for instance. That is, they may be packetized into transport stream packets, namely, packets of one packet ID for one of the partial data streams 324, and packets of another packet ID for another partial data stream 324. Other ways of multiplexing partial data streams 324 within a transport stream have been discussed above and may be reused with respect to the transmission of a legacy-conformant partial data stream.

In the following, NAL units 326 of type B are exemplarily presented and called skipping NAL units, whereas NAL units 326 of type A are illustrated using a syntax called hidden NAL units.

Thus, FIGS. 9 to 12 related to an exemplary case where at least two ESs are used for the transport of a full panorama. One of the ESs is a substream such as $324_1$ representing the encoded video for a subregion $304_1$, and this substream is a standard conformant stream by itself and can be decoded by legacy decoders, if they are capable of decoding the level for that substream.

The combination with at least one other substream $324_2$ transported in a different ES is sent to the data stream processor such as 127 for further processing, which can result in extraction of a conformant bitstream for a different subregion. In this case, some data portions used at the input of the data stream processor 127 for its proper function, such as parameter sets 316 that provide information for the whole panorama, could prevent the legacy decoder from decoding the subregion that is intended to be decoded by such legacy devices. In order to resolve this issue, such data portions are made invisible for the legacy decoders, while advanced devices can process them.

Decoders process the video bitstream as a sequence of data units, which in case of HEVC encoding are represented by so-called "NAL units". The size of the NAL units is implicitly indicated by start codes that indicate the start of each NAL unit. Following the start code, each NAL unit starts with a header that contains information about the type of the NAL unit. If the decoder does not recognize the type indicated in the NAL unit header, it ignores the NAL unit. Some NAL unit type values are reserved, and NAL units indicating a type that is reserved will be ignored by all standard conformant decoders.

In order to render a NAL unit invisible for a legacy decoder, the header with the original NAL unit type field is prepended by a header with a reserved value. The advanced processor recognizes this type value and implements a different processing, i.e., the insertion is reverted and the original NAL unit is processed. Two reserved NAL unit type values are used to form two different pseudo NAL units. If the first type is encountered by an advanced processor, the insertion is reverted. If the second type is encountered, the pseudo NAL unit and the immediately following NAL unit are removed from the bitstream.

---

NAL unit syntax from ISO/IEC 23008-2:
nal_unit( NumBytesInNalUnit ) {
   nal_unit_header ( )
   NumBytesInRbsp = 0
   for ( i = 2; i < NumBytesInNalUnit; i++ )

```
    if ( i + 2 < NumBytesInNalUnit && next_bits( 24 ) = = 0x000003 ) {
        rbsp_byte[ NumBytesInRbsp++ ]
        rbsp_byte[ NumBytesInRbsp++ ]
        i += 2
        emulation_prevention_three_byte /* equal to 0x03 */
    }else
        rbsp_byte[ NumBytesInRbsp++ ]
}
nal_unit_header( ) {
    forbidden_zero_bit
    nal_unit_type
    nuh_layer_id
    nuh_temporal_id_plus1
}
```
New syntax of the hidden NAL unit:
```
    hidden_nal_unit{
    hiding_nal_unit_header( )
    original_nal_unit( )
}
```
New syntax of the hiding NAL unit header:
```
hiding_nal_unit_header{
    forbidden_zero_bit
    hiding_nal_unit_type
    nuh_layer_id
    nuh_temporal_id_plus1
}
```
hiding_nal_unit_type is set to 50, which is a NAL unit type marked as "unspecified" in ISO/IEC 23008-2.
nuh_layer_id and nuh_temporal_id_plus1 are copied from the original NAL unit header.
New syntax of the skipping NAL unit:
```
skipping_nal_unit{
    forbidden_zero_bit
    skipping_nal_unit_type
    nuh_layer_id
    nuh_temporal_id_plus1
}
``` skipping_nal_unit_type is set to 51, which is a NAL unit type marked as "unspecified" in ISO/IEC 23008-2.

nuh_layer_id and nuh_temporal_id_plus1 are copied from the original NAL unit header.

Figure 14:
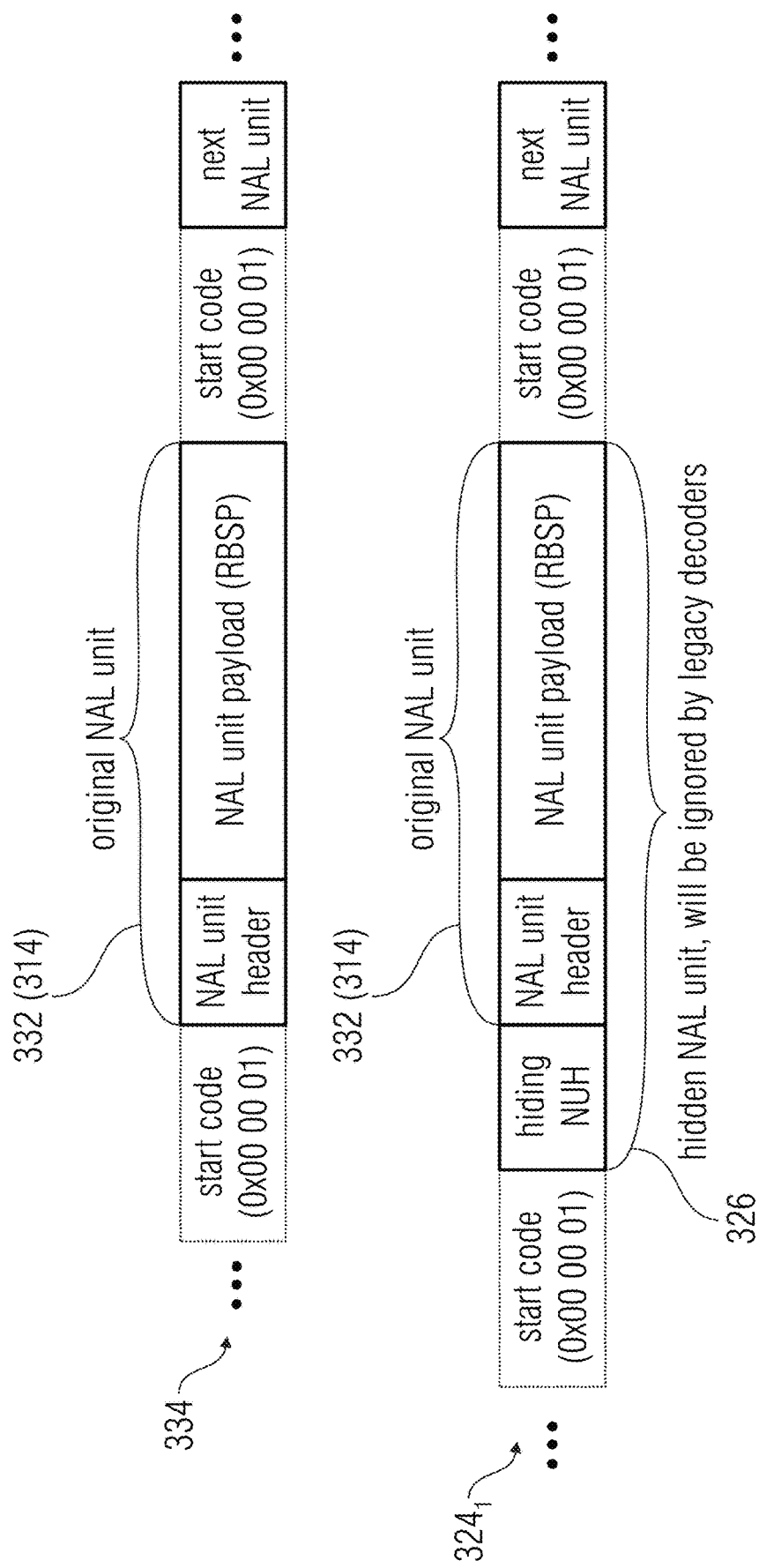
FIG. 14 shows an example of a special type of added NAL unit of FIG. 12, namely one carrying a hidden NAL unit, hidden with respect to legacy decoders.

In the hiding process which is illustrated in FIG. 14 by transitioning from top to bottom, a single NAL unit is formed of the hiding_nal_unit_header together with the original_nal_unit. There is only one start code preceding the combined NAL unit.

The unhiding process which is illustrated in FIG. 14 by transitioning from bottom to top, just removes the hiding_nal_unit_header, which is located between the start code and the original NAL unit.

Figure 15:
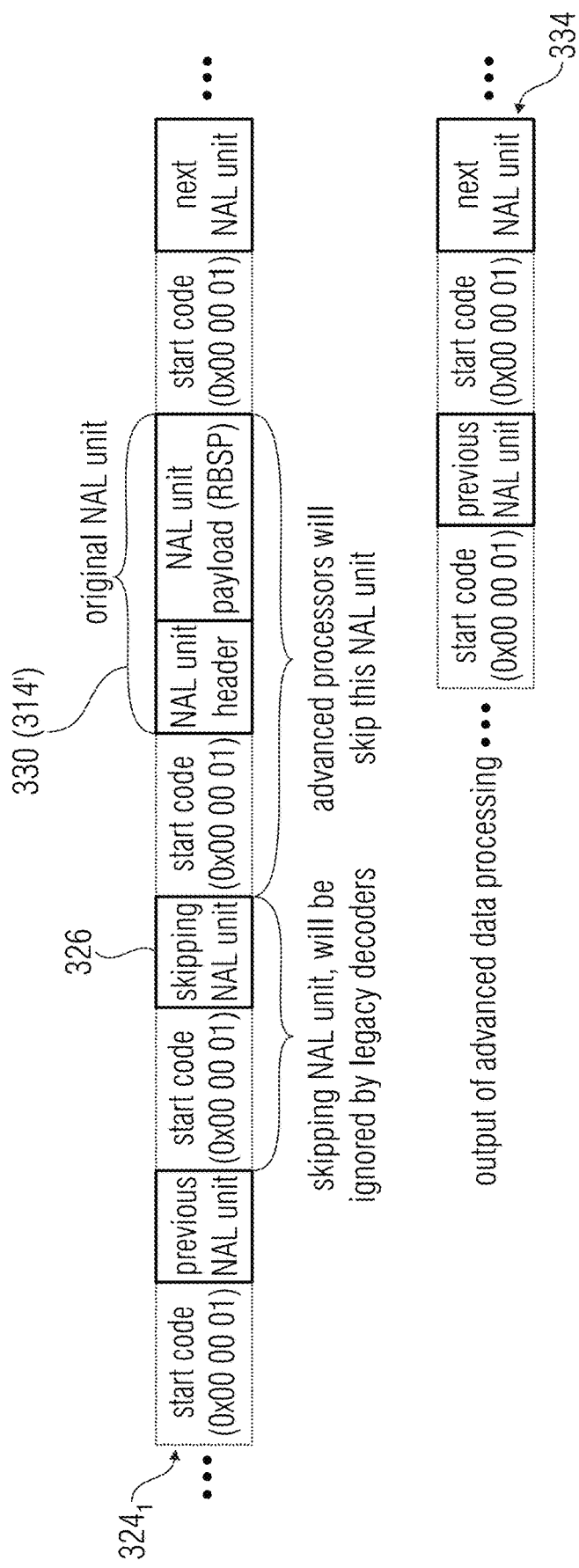
FIG. 15 illustrates a schematic diagram showing the mechanism of a second type of NAL unit added according to FIG. 12, these NAL units forming a hidden instruction to disregard the subsequent NAL unit in the corresponding data stream, this hidden instruction being disregarded by legacy decoders.

The process that lets an advanced decoder skip an original NAL unit needs that the skipping_nal_unit is inserted in the bitstream before the original NAL unit, which means that there are two NAL units, each prepended by a start code. The skipping is illustrated in FIG. 15 by transitioning from top to bottom and the preparation (insertion) is illustrated in FIG. 15 by transitioning from bottom to top.

According to an advantageous alternative described now, rather than skipping NAL units as a whole, skipping merely a part thereof is allowed to be signaled by way of the inserted NAL units 326. In principle, there are two options: Either the following NAL unit is skipped entirely. This instruction has been signaled by skip NAL units 326 according to the above example only. According to an alternative, only part of any subsequent NAL unit is skipped. The latter is useful in case that multiple Elementary Streams are combined and the skipped part of the NAL unit is replaced by information from the Elementary Stream that is prepended to the stream that contains the partly skipped NAL unit. This will be explained in more detail below. The afore-presented syntax example could be adapted, in case, in the following manner:

```
skipping_nal_unit{
    forbidden_zero_bit
    skipping_nal_unit_type
    nuh_layer_id
    nuh_temporal_id_plus1
    bytes_to_skip
}
```

Here, bytes_to_skip indicates the number of bytes to be skipped of the following NAL unit. If this value is set to zero, the whole following NAL unit is skipped.

Figure 16:
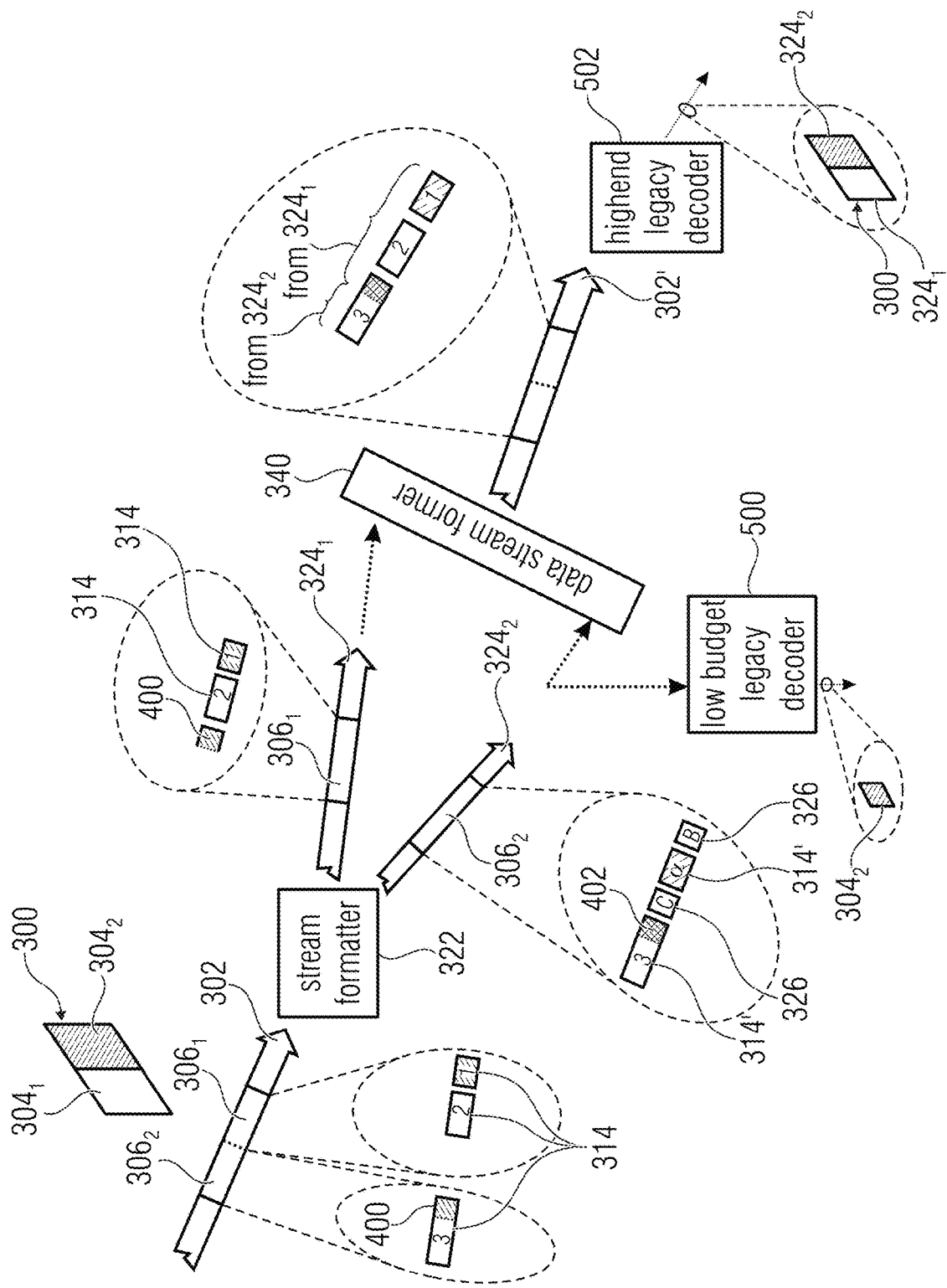
FIG. 16 shows a schematic diagram illustrating a scenario where a stream formatter which distributes a data stream onto partial data streams in a manner similar to FIG. 12, namely, in that one of same is turned into a self-contained data stream ready to be processed by a legacy decoder for reconstructing therefrom the corresponding segment as a self-contained picture, prepares the partial data streams additionally in a manner so that concatenating the partial data streams as instructed by the instructions signaled by way of the specific NAL units inserted and supposed to be disregarded by legacy decoders due to being of a disallowed NAL unit type, also leads to a legacy conform data stream which may be subject to decoding by a legacy decoder for reconstruction of the overall picture; here, NAL units forming a hidden instruction to disregard a part of the subsequent NAL unit are used.

This alternative is described in more detail with respect to FIG. 16. FIG. 16 shows a stream formatter 322 and a scenario where this stream formatter 322 receives a data stream 302 having encoded thereinto a picture 300 or a video with a picture 300 segmented into spatial segments $304_1$ and $304_2$ as discussed above, i.e., in a manner enabling the extraction of partial data streams with respect to the spatial segments. As is true with all the above discussed embodiments, the number of segments is not critical and might even be increased.

For ease of understanding the variation discussed with respect to FIG. 16, it is preliminarily assumed that the encoding of picture 300 into data stream 302 took place in a manner where merely one slice NAL unit has been spanned for each segment $304_1$ and $304_2$, and that the access unit relating to picture 300 and consisting of fragments $306_1$ and $306_2$ merely contains one parameter set NAL unit 314 at the beginning. The three resulting NAL units in data stream 300 for picture 300 are numbered #1, #2 and #3 with NAL unit #1 being in the lead and being the parameter set NAL unit. It is, thus, distinguished from NAL units #2 and #3 by hatching. NAL units #2 and #3 are the slice NAL units. NAL unit #2 is a NAL unit 314 within fragment 306₁ relating to segment 304₁ and NAL unit #3 is a NAL unit 314 within fragment 306₂ relating to spatial segment 304₂. It is the only NAL unit within fragment 306₂.

Stream formatter 322 seeks to split-up data stream 302 into two partial data streams 324₁ and 324₂, the former relating to spatial segment 304₁ and the latter relating to spatial segment 304₂, with rendering partial data stream 324₂ a self-contained data stream which is decodable by a legacy decoder with respect to spatial segment 304₂ as a self-contained picture area rather than partial data stream 324₁ as it has been the case in the discussion of FIG. 12. As becomes clear from the discussion of FIG. 12, stream formatter 322 attends to two problems associated with turning fragment 306₂ into a self-contained data stream; namely, 1) fragment 306₂ does not yet have any parameter set NAL unit, and 2) fragment 306₂ contains a slice NAL unit; namely, NAL unit 314 #3, the slice header 400 of which contains the wrong slice address, i.e., it contains a slice address addressing the beginning of segment 304₂ relative to the overall picture area of picture 300 such as, for instance, with respect to the upper left hand corner of picture 300, rather than relative to spatial segment 304₂ which is to represent the self-contained picture area of partial data stream 324₂ for the low-budget legacy decoder. Accordingly, stream formatter 322 adds an appropriately designed parameter set NAL unit 314' to fragment 306₂ in transferring the same onto partial data stream 324₂. Stream formatter 322 arranges this parameter set NAL unit 314' in front of slice NAL unit 314' of fragment 306₂; namely, slice NAL unit #3, which differs from the corresponding slice NAL unit 314 #3 in data stream 302 with respect to its slice header. In order to illustrate the difference in slice header, the slice header of slice NAL unit #3 is shown with non-hatching and indicated using reference sign 400 with respect to its version as contained in data stream 302, and indicated using cross-hatching and using reference sign 402 as far as its modified version within partial data stream 324₂ is concerned. Beyond, however, stream formatter 322 precedes the parameter set NAL unit 314' with skip NAL unit 326 of type B so that the parameter set NAL unit 314' will be skipped by the processing apparatus or data stream former 340 which is fed with partial data stream 324₂. Beyond this, however, stream formatter 322 precedes the slice NAL unit 314' #3 with a slice NAL unit 326 of type C. That is, this partial skip NAL unit 326 of type C is also of a NAL unit type disallowed with respect to legacy decoders. Data stream former or processing apparatus 340 designed to correctly interpret NAL unit 326 of type C, however, interprets the instruction conveyed by this NAL unit to the extent that portion 402 of the succeeding slice NAL unit 314' is to be cut off or disregarded. The composition of this "lost" header will become clear from the following description. Firstly, however, FIG. 16 illustrates as to what would happen if a low-budget legacy decoder 500 would be fed with partial data stream 324₂. In particular, this low-budget legacy decoder 500 would, as NAL units of types B and C are of the disallowed NAL unit types, disregard or drop these NAL units 326 so that merely NAL units 314' remain which, as discussed above with respect to FIG. 11b, result in a correct and self-contained decoding of a picture coinciding in shape and content with segment 304₂.

Additionally, however, stream formatter 322 adds the erstwhile version 400 of the slice header of slice NAL unit #3 at the end of stream fragment 306₁ which has been distributed by stream formatter 322 to partial data stream 324₁ so as to be adopted therein without any amendment. This, in turn, means that the partial data stream 324₁ has, as an access unit relating to the time stamp of picture 300, therein an "incomplete fragment"; namely, the exact copy of the NAL units 314 within the corresponding fragment 306₁, followed by the incomplete leading portion of the only NAL unit of the subsequent fragment 306₂; namely, the erstwhile slice header 400 thereof. The significance thereof is the following.

In particular, when data stream former 340 receives both partial data streams 324₁ and 324₂, data stream former 340 performs, with respect to self-contained data stream 324₂, the actions instructed by the special NAL units 326, and then concatenates partial data stream 324₁ and 324₂. The result of this concatenation plus instruction performance, however, is a data stream 302' within which the NAL units relating to the time instant of picture 300 are an exact copy of the three NAL units 314 of the original data stream 302. A highend legacy decoder 502 which receives data stream 302' will, accordingly, decode therefrom the overall picture 300 having both spatial segments 304₁ and 304₂ included therein.

Figure 17:
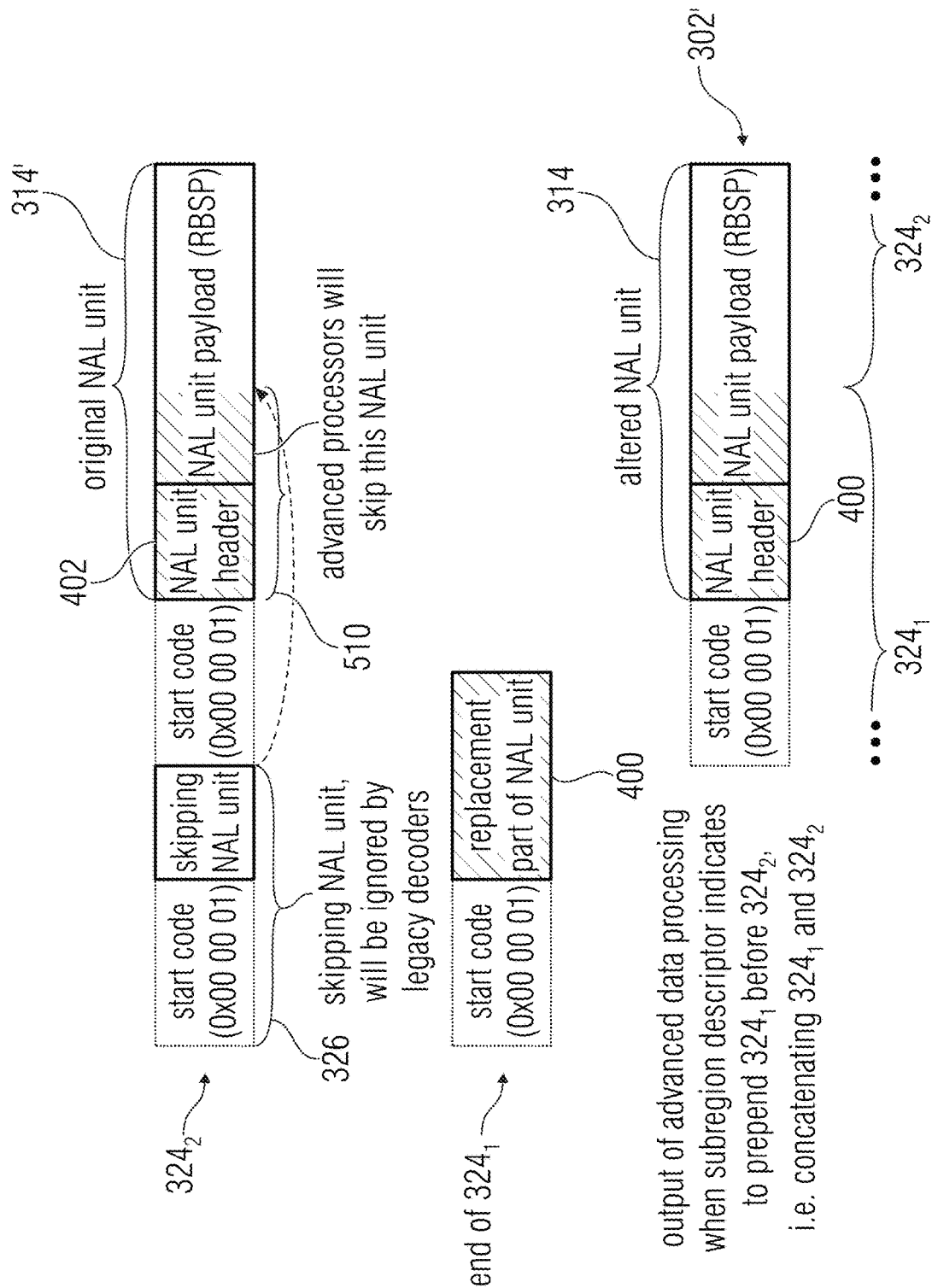
FIG. 17 shows a schematic diagram illustrating, in more detail than FIG. 16, the modification and instruction mechanism signaled by way of the partial skip NAL unit used in the embodiment of FIG. 16.

The code modification instruction caused by the NAL units type C 326 discussed with respect to FIG. 16, is shown in even more detail with respect to FIG. 17. In particular, here it is shown that NAL units of type C, 326, may indicate the portion to be cut-out from a succeeding NAL unit 314'; namely, portion 510, might be indicated using a length indication indicating the portion to be cut-out from the succeeding NAL unit 314' within the respective partial data stream 324₂, such as measured from the beginning of the respective succeeding NAL unit 314' rather than determining the portion to be cut-out semantically such as by indicating that the NAL unit header 402 is to be cut-out as described previously with respect to FIG. 16 for sake of an easier understanding. Naturally, the indication of which part is to be cut-out, may alternatively by realized in any other manner. For instance, a length indication indicated in a NAL unit 326 of type C may indicate the portion to be cut-out, i.e., portion 510, by way of a length indication, the length indicated by which is to be measured from an end of the preceding NAL unit relative to NAL unit 326 of type C, or any other indication prescription may be used.

Thus, the description with respect to FIGS. 9 to 17 revealed a data stream, namely 324₁ in FIGS. 12 and 324₂ in FIG. 16, having been made self-contained. It is composed of a sequence of NAL units. The sequence of NAL units comprises a first set of one or more NAL units 314' which forms a self-contained data stream parameterized so as to encode a first picture, the NAL units 314' of the first set being selected out of a first set of one or more NAL unit types. Further, the sequence of NAL units comprises a second set of one or more NAL units 326 each of which is of one of a second set of one or more predetermined NAL unit types, disjoint to the first set, and determined to lead to an ignorance of the respective NAL unit by a legacy decoder. The second set of one or more NAL units 326 may be interspersed into, or arranged within, the sequence of NAL units such that by, for each NAL unit 326 of the second set, discarding an immediately succeeding NAL unit 330 of the first set, or a portion 402 thereof, from the sequence of NAL units along with the respective NAL unit 326 of the second set and/or inserting a NAL unit 332 of one of the first NAL unit types, carried in a payload section of the respective NAL unit 326 of the second set, into the sequence of NAL units in replacement of the respective NAL unit of the second set, the sequence of NAL units is converted into a converted sequence of NAL units 334 which forms, except for slice addresses contained in one or more of the first set of one or more NAL units, a fragment 306₁ of a greater self-contained data stream having encoded thereinto a picture 300 composed of a plurality of spatial segments 304$_{1,2}$ a predetermined one 304$_1$ of which is the first picture. The fragment 306$_1$ is amendable to the greater self-contained data stream by concatenating the converted sequence of NAL units 334 with one or more other NAL unit sequences 324$_2$ having encoded thereinto each spatial segment 304$_2$ of the picture other than the predetermined spatial segment and parameterized, except for slice addresses contained in one or more of the first set of one or more NAL units, so as to encode, when being concatenated with the one or more other NAL unit sequences, the predetermined spatial segment 304$_1$ within the picture. As illustrated with respect to FIG. 16, the predetermined spatial segment may be another than the—in coding order 308—first spatial segment. The second set of one or more NAL units 326 may comprise a predetermined NAL unit of the second set which precedes a first NAL unit 330 of the first set comprising a payload section carrying a first parameter set referred to by at least one second NAL unit of the first set, the predetermined NAL unit 326 indicating that the first NAL unit 330, or a portion 402 thereof, is to be discarded from the sequence of NAL units along with the predetermined NAL unit. The second set of one or more NAL units may comprise a predetermined NAL unit 326 of the second set which succeeds a first NAL unit of the first set comprising a payload section carrying a first parameter set referred to by at least one second NAL unit of the first set, the predetermined NAL unit 326 having a payload section carrying a third NAL unit 332 of one of the first NAL unit types, the third NAL unit comprising a payload section carrying a second parameter set which substitutes the first parameter set when the third NAL unit 332 is inserted into the sequence of NAL units in replacement of the predetermined NAL unit 326. In case of a predetermined one of second set of one or more NAL units 326 instructing a removal of merely a portion 402 of the subsequent NAL unit 314', same may optionally indicate the length of this portion 402. The substitute, i.e. the incomplete slice fragment, may be appended at another fragment 306 by the stream formatter, but alternatively, a hidden NAL unit carrying the portion substitute may be used and arranged in a manner preceding the partial skip NAL unit. The succeeding NAL unit partially skipped could be a slice NAL unit comprising a payload section carrying slice data including a slice header, at least partially covered by the portion 402 to be skipped, followed by slice payload data having encoded thereinto the corresponding slice of that slice NAL unit. The incomplete slice fragment and the portion to be discarded comprise, at least, a slice address of a slice header, the slice address comprised by the incomplete slice fragment being defined relative to a circumference of the picture and the slice address comprised by the portion to be discarded being defined relative to a circumference of the predetermined spatial segment 304$_2$ such as in both case relative to the upper left corner from which the coding order 308 starts.

An apparatus 322 for generating a first data stream 324$_1$ out of a second data stream 302 has been described above in FIG. 12. It may be a stream divider in case of outputting more than just one partial data stream 324$_1$. The second data stream has encoded thereinto a picture 300 composed of a plurality of spatial segments 304$_{1,2}$, wherein the second data stream is composed of a sequence of NAL units, the sequence of NAL units comprising a first set of one or more NAL units 314 parameterized so as to encode a predetermined spatial segment 304$_1$, the NAL units of the first set being selected out of a first set of one or more NAL unit types, wherein the apparatus is configured to cut-out the first set of one or more NAL units 314 out of the second data stream 302 so as to adopt same into the first data stream 324$_1$; re-parameterize the first set of one or more NAL units so as to encode the predetermined spatial segment as a self-contained picture; insert a second set of one or more NAL units 326 into the first data stream each of which is of one of a second set of one or more predetermined NAL unit types, disjoint to the first set, and determined to lead to an ignorance of the respective NAL unit 326 by a legacy decoder. The apparatus 322 may be configured to arrange the second set of one or more NAL units relative to the first set of one or more NAL units, i.e. intersperse the second set into, and/or prepend and/or append it to, the first set of one or more NAL units such that, each NAL unit of the second set, prescribes a discarding of an immediately succeeding NAL unit 330 of the first set from the sequence of NAL units along with the respective NAL unit of the second set and/or prescribes inserting a hidden NAL unit 332 of one of the first NAL unit types, carried in a payload section of the respective NAL unit of the second set, into the sequence of NAL units in replacement of the respective NAL unit of the second set. The immediately succeeding NAL unit is, for example, a parameter set NAL unit, and/or the hidden NAL unit is a parameter set NAL unit as contained in the second data stream.

An apparatus 340 for processing a data stream such as 324$_1$ has been described with respect to FIG. 13. It may be extended to a decoder if outputting picture content such as picture 300 instead of a data stream 302', or a set of one or more fragments thereof such as, for instance, fragment 334 derived from partial data stream 324$_1$ only. Apparatus 340 receives data stream 324$_1$ which is composed of a sequence of NAL units, the sequence of NAL units comprising a first set of one or more NAL units 314' which forms a self-contained data stream parameterized so as to encode a first picture, the NAL units of the first set being selected out of a first set of one or more NAL unit types, and a second set of one or more NAL units 326 each of which is of one of a second set of one or more predetermined NAL unit types, disjoint to the first set, wherein the second set of one or more NAL units is arranged in, or interspersed into, the sequence of NAL units. Apparatus discriminates each NAL unit of the second type from the set of one or more NAL units of the first type by inspecting a NAL unit type syntax element in each NAL unit which indicates the NAL unit type. If this syntax element has a value within a first set of values, it is appointed a NAL unit of the first NAL unit type, and if this syntax element has a value within a second set of values, it is appointed a NAL unit of the second NAL unit type. Different types of NAL units 326 (second type) may be distinguished. This may be done by the NAL unit type syntax element, i.e. by assigning to these different NAL units 326 such as types A, B and C as discussed above, different ones of the reserved NAL unit types (the second set of values of the NAL units type syntax element). Discrimination between the latter may, however, also be done by a syntax element in the payload section of each inserted NAL unit 326. The NAL unit type syntax element also distinguishes slice NAL units from parameter set NAL units, i.e. they have NAL unit type syntax elements of different values within the first set of values. For a predetermined NAL unit 326 of the second set, apparatus 340 discards an immediately succeeding NAL unit 330 of the first set, or portion 402 thereof, from the sequence of NAL units along with the respective NAL unit of the second set. For one NAL unit 326, apparatus 340 may discard the succeeding NAL unit slice as a whole, and for another merely portion 402. Apparatus may, however, also deal merely with either one of these options. The portion 402 might be indicated by way of a length indication in the payload section of the respective NAL unit 326, or portion 402 is determined by 340 otherwise such as by parsing. Portion 402 is, for example, the slice header of the succeeding NAL unit. Additionally or alternatively, apparatus may for another predetermined NAL unit 326 of the second set, discard an immediately succeeding NAL unit 330 of the first set, or portion 402 thereof, from the sequence of NAL units along with the respective NAL unit of the second set, and insert a NAL unit 332 of one of the first NAL unit types, carried in a payload section of the respective NAL unit of the second set, into the sequence of NAL units in replacement of the respective NAL unit of the second set. Additionally or alternatively, apparatus may for even another predetermined NAL unit 326 of the second set, insert a NAL unit 332 of one of the first NAL unit types, carried in a payload section of the respective NAL unit of the second set, into the sequence of NAL units in replacement of the respective NAL unit of the second set. Apparatus 340 may be configured to concatenate a converted sequence of NAL units as obtained by the discarding and/or inserting, potentially with modifying slice addresses contained in one or more of the first set of one or more NAL units, with one or more other NAL unit sequences $324_2$ having encoded thereinto each spatial segment of a larger picture other than the predetermined spatial segment. The concatenation sorts the NAL unit sequences along the coding order so that the slice addresses in slice NAL units within the NAL units sequences monotonically increases. This concatenation along with the performance of the instructions indicated by way of the NAL units 326, results in a data stream 302' which equals data stream 302 or is an equivalent thereof, i.e. it's decoding results in picture 300 having the predetermined spatial section as one of its spatial segments. If any self-contained partial data stream would be fed into a legacy decoder, owing to the discarding of NAL units 326, a decoding of the corresponding spatial segment would result.

With respect to FIGS. 12 and 16, it should be noted that the stream formatter 322 shown therein could be split-up into two consecutive entities, namely one performing merely task of distributing the NAL units of all partial data streams from one common stream onto the respective partial data stream, i.e. the task of demultiplexing or stream distribution, and another one which is connected upstream to the former one and performs the remaining tasks described above. At least some of the tasks could even be performed by the encoder which generates the original NAL units 314.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A stream demultiplexer, comprising:
a data stream former configured to selectively extract at least two separate substreams from a group of separate substreams, the at least two separate substreams comprising encoded data coding different spatial segments or different groups of subsequent spatial segments of a video picture of a video stream, wherein the data stream former is configured to combine the at least two separate substreams to a data stream comprising the encoded data coding the different spatial segments or different groups of subsequent spatial segments of the video picture of the video stream, wherein the different spatial segments or different groups of subsequent spatial segments of the video picture of the video stream are encoded such that the encoded data comprises, for each spatial segment or group of spatial segments, at least one slice, wherein the slice or slices for each spatial segment or group of spatial segments are packetized into one separate substream, wherein the slices of at least one of the spatial segments or groups of subsequent spatial segments are packetized into the separate substream, wherein a further separate substream comprises suitable slice headers which are, relative to the slices of the at least one of the spatial segments or groups of subsequent spatial segments, modified with respect to its picture position or picture size; and
an output interface configured to provide the data stream;
wherein the data stream former is configured to combine the at least two separate substreams to a HEVC standard conformant data stream,
wherein the data stream former is configured to modify a header information of the at least two separate substreams or to add a header information to the at least two separate substreams based on the suitable slice headers comprised in the further separate sub stream, to obtain the HEVC standard conformant data stream;
wherein the group of separate substreams comprises a subgroup of one or more separate substreams
each coding a respective spatial segment or a respective group of subsequent spatial segments,
each comprising a sequence of NAL units, and
the sequence of NAL units being composed of
a first set of one or more NAL units which forms a standard conformant version of a data stream representing the respective spatial segment or the respective group of subsequent spatial segments of the respective substream, and
a second set of one or more NAL units which are of one of a set of one or more predetermined NAL unit types for ignorance of the respective NAL unit by a legacy decoder.

2. The stream demultiplexer according to claim 1, wherein the second set of one or more NAL units is arranged in the sequence of NAL units, each NAL unit of the second set
indicating to a non-legacy decoder that an immediately succeeding NAL unit of the first set or a portion thereof is to be discarded from the sequence of NAL units along with the respective NAL unit of the second set and/or
comprising a payload section carrying a NAL unit to be inserted into the sequence of NAL units in replacement of the respective NAL unit of the second set.

3. The stream demultiplexer according to claim 1, configured to, if any of the subgroup of separate substreams is among the extracted at least two separate substreams, for each NAL unit of the second set
discard an immediately succeeding NAL unit of the first set or a portion thereof from the sequence of NAL units along with the respective NAL unit of the second set and/or
insert a NAL unit carried in a payload section of the respective NAL unit of the second set into the sequence of NAL units in replacement of the respective NAL unit of the second set.

4. An apparatus for generating a first data stream out of a second data stream, the second data stream having encoded thereinto a picture composed of a plurality of spatial segments, wherein the second data stream is composed of a sequence of NAL units, the sequence of NAL units comprising a first set of one or more NAL units parameterized so as to encode a predetermined spatial segment, the NAL units of the first set being selected out of a first set of one or more NAL unit types, wherein the apparatus is configured to
cut-out the first set of one or more NAL units out of the second data stream so as to adopt same into the first data stream;
re-parameterize the first set of one or more NAL units so as to encode the predetermined spatial segment as a self-contained picture;
insert a second set of one or more NAL units into the first data stream each of which is of one of a second set of one or more predetermined NAL unit types, disjoint to the first set, and determined to lead to an ignorance of the respective NAL unit by a legacy decoder.

5. The apparatus according to claim 4, configured to intersperse the second set of one or more NAL units into, and/or prepended and/or appended to, the first set of one or more NAL units such that, each NAL unit of the second set,
prescribes a discarding of an immediately succeeding NAL unit of the first set, or a portion thereof, from the sequence of NAL units along with the respective NAL unit of the second set and/or
prescribes inserting a hidden NAL unit of one of the first NAL unit types, carried in a payload section of the respective NAL unit of the second set, into the sequence of NAL units in replacement of the respective NAL unit of the second set.

6. The apparatus according to claim 5, the immediately succeeding NAL unit is a parameter set NAL unit, and/or the hidden NAL unit is a parameter set NAL unit as comprised in the second data stream and/or the portion at least partially comprises a slice header of the immediately succeeding NAL unit.

7. The apparatus according to claim 5, configured to further form one or more partial data streams out of one or more NAL unit sequences of the second data stream having encoded thereinto spatial segments of the picture other than the predetermined spatial segment, and insert the second set of one or more NAL units into the first data stream and form the one or more partial data streams such that
the discarding of the second set of one or more NAL units results in a self-contained data stream having encoded therein the predetermined spatial segment as a self-contained picture and
executing the prescription by the each NAL unit of the second set and concatenating the first data stream and the one or more partial data streams results in a self-contained data stream having encoded thereinto the picture as a whole.

8. The apparatus according to claim 4, configured to
  intersperse the second set of one or more NAL units into, or prepend same to, the first set of one or more NAL units such that, at least one NAL unit of the second set, prescribes a discarding of a portion of an immediately succeeding NAL unit of the first set, from the sequence of NAL units along with the respective NAL unit of the second set, and
  append to NAL units of the first NAL unit type of another data stream, having encoded thereinto a in coding order immediately preceding spatial segment of a picture which comprises the predetermined spatial segment and the immediately preceding spatial segment, an incomplete slice fragment at its end which is to substitute, upon concatenation of the first data stream and the other data stream, the portion to be discarded.

9. An apparatus for processing a data stream configured to
  receive a data stream being composed of a sequence of NAL units, the sequence of NAL units comprising
  a first set of one or more NAL units which forms a self-contained data stream parameterized so as to encode a first picture, the NAL units of the first set being selected out of a first set of one or more NAL unit types, and
  a second set of one or more NAL units each of which is of one of a second set of one or more predetermined NAL unit types, disjoint to the first set, wherein the second set of one or more NAL units is interspersed into the sequence of NAL units,
  for each NAL unit of the second set,
  discard an immediately succeeding NAL unit of the first set, or a portion thereof, from the sequence of NAL units along with the respective NAL unit of the second set and/or
  insert a NAL unit of one of the first NAL unit types, carried in a payload section of the respective NAL unit of the second set, into the sequence of NAL units in replacement of the respective NAL unit of the second set.

10. The apparatus according to claim 9, configured to
  concatenate, a converted sequence of NAL units as acquired by the discarding and/or inserting, with one or more other NAL unit sequences having encoded thereinto each spatial segment of a larger picture other than the predetermined spatial segment.

11. The apparatus according to claim 9, configured to
  concatenate, a converted sequence of NAL units as acquired by the discarding and/or inserting, with modifying slice addresses comprised in one or more of the first set of one or more NAL units, with one or more other NAL unit sequences having encoded thereinto each spatial segment of a larger picture other than the predetermined spatial segment.

12. A method for generating a first data stream out of a second data stream, the second data stream having encoded thereinto a picture composed of a plurality of spatial segments, wherein the second data stream is composed of a sequence of NAL units, the sequence of NAL units comprising a first set of one or more NAL units parameterized so as to encode a predetermined spatial segment, the NAL units of the first set being selected out of a first set of one or more NAL unit types, wherein the method comprises
  cut-out the first set of one or more NAL units out of the second data stream so as to adapt same in the first data stream;
  re-parameterize the first set of one or more NAL units so as to encode the predetermined spatial segment as a self-contained picture;
  insert a second set of one or more NAL units into the first data stream each of which is of one of a second set of one or more predetermined NAL unit types, disjoint to the first set, and determined to lead to an ignorance of the respective NAL unit by a legacy decoder.

13. A method for processing a data stream comprising
  receive a data stream being composed of a sequence of NAL units, the sequence of NAL units comprising
  a first set of one or more NAL units which forms a self-contained data stream parameterized so as to encode a first picture, the NAL units of the first set being selected out of a first set of one or more NAL unit types, and
  a second set of one or more NAL units each of which is of one of a second set of one or more predetermined NAL unit types, disjoint to the first set, wherein the second set of one or more NAL units is interspersed into the sequence of NAL units,
  for each NAL unit of the second set,
  discard an immediately succeeding NAL unit of the first set from the sequence of NAL units along with the respective NAL unit of the second set and/or
  insert a NAL unit of one of the first NAL unit types, carried in a payload section of the respective NAL unit of the second set, into the sequence of NAL units in replacement of the respective NAL unit of the second set.

14. A non-transitory digital storage medium having stored thereon a computer program for performing a method for generating a first data stream out of a second data stream, the second data stream having encoded thereinto a picture composed of a plurality of spatial segments, wherein the second data stream is composed of a sequence of NAL units, the sequence of NAL units comprising a first set of one or more NAL units parameterized so as to encode a predetermined spatial segment, the NAL units of the first set being selected out of a first set of one or more NAL unit types, wherein the method comprises
  cut-out the first set of one or more NAL units out of the second data stream so as to adapt same in the first data stream;
  re-parameterize the first set of one or more NAL units so as to encode the predetermined spatial segment as a self-contained picture;
  insert a second set of one or more NAL units into the first data stream each of which is of one of a second set of one or more predetermined NAL unit types, disjoint to the first set, and determined to lead to an ignorance of the respective NAL unit by a legacy decoder,
  when said computer program is run by a computer.

15. A non-transitory digital storage medium having stored thereon a computer program for performing a method for processing a data stream comprising
  receive a data stream being composed of a sequence of NAL units, the sequence of NAL units comprising
  a first set of one or more NAL units which forms a self-contained data stream parameterized so as to encode a first picture, the NAL units of the first set being selected out of a first set of one or more NAL unit types, and
  second set of one or more NAL units each of which is of one of a second set of one or more predetermined NAL unit types, disjoint to the first set, wherein the second set of one or more NAL units is interspersed into the sequence of NAL units, for each NAL unit of the second set, discard an immediately succeeding NAL unit of the first set from the sequence of NAL units along with the respective NAL unit of the second set and/or insert a NAL unit of one of the first NAL unit types, carried in a payload section of the respective NAL unit of the second set, into the sequence of NAL units in replacement of the respective NAL unit of the second set, when said computer program is run by a computer.

* * * * *